(12) United States Patent
Hwang et al.

(10) Patent No.: US 11,563,820 B2
(45) Date of Patent: Jan. 24, 2023

(54) HOME APPLIANCE AND CONTROL METHOD FOR THE SAME

(71) Applicant: SAMSUNG ELECTRONICS CO., LTD., Suwon-si (KR)

(72) Inventors: Soonhoon Hwang, Suwon-si (KR); Youngju Joo, Suwon-si (KR); Hyun-Woo Ock, Suwon-si (KR); Maloochandra Ashok, Suwon-si (KR); Kwan-Ho Park, Suwon-si (KR); Dongjun Shin, Suwon-si (KR); Jungmo Yeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 349 days.

(21) Appl. No.: 16/845,453

(22) Filed: Apr. 10, 2020

(65) Prior Publication Data
US 2020/0333034 A1 Oct. 22, 2020

(30) Foreign Application Priority Data
Apr. 11, 2019 (KR) .......................... 10-2019-0042266

(51) Int. Cl.
*G05B 13/00* (2006.01)
*H04L 67/50* (2022.01)
(Continued)

(52) U.S. Cl.
CPC ............ *H04L 67/535* (2022.05); *F24F 11/64* (2018.01); *G06N 3/08* (2013.01); *G16Y 40/30* (2020.01);
(Continued)

(58) Field of Classification Search
CPC .... G05B 23/0297; G06F 21/445; F24F 11/30; F24F 11/72; H02J 13/0006; G06Q 10/20;
(Continued)

(56) References Cited

U.S. PATENT DOCUMENTS

| 10,541,865 B1* | 1/2020 | Brophy ............... H04L 41/0816 |
| 2011/0273625 A1* | 11/2011 | McMahon ........... G06F 21/445 |
| | | 348/734 |

(Continued)

FOREIGN PATENT DOCUMENTS

| JP | 2018-50309 | 3/2018 |
| KR | 10-1757446 | 7/2017 |

(Continued)

OTHER PUBLICATIONS

Ho, S Y D, "Acknowledge Mode Polling with immediate Status Report Timing", CN 101809923, (translation) Aug. 8, 2018, 20 pg <CN_101809923.pdf>.*

(Continued)

*Primary Examiner* — Tuan A Vu
(74) *Attorney, Agent, or Firm* — Staas & Halsey LLP

(57) ABSTRACT

Provided is a home appliance of determining an operation command corresponding to an occupant through learning based on setting information of the home appliance according to the occupant to provide an operation satisfying all occupants. An air conditioner according to an embodiment of the disclosure includes: an outdoor unit; and an indoor unit including a heat exchanger, wherein the indoor unit includes: a communicator configured to communicate with an access point (AP); and a controller configured to receive information about a terminal connected to the access point through the communicator, and change at least one of operation temperature or an operation mode when a new terminal is connected to the access point or a terminal connected to the access point is disconnected from the access point.

16 Claims, 19 Drawing Sheets

(51) Int. Cl.
*F24F 11/64* (2018.01)
*G16Y 40/30* (2020.01)
*G06N 3/08* (2006.01)
*H05B 47/19* (2020.01)
*H04L 41/0816* (2022.01)
*G06Q 10/00* (2012.01)

(52) U.S. Cl.
CPC .......... *G06Q 10/20* (2013.01); *H04L 41/0816* (2013.01); *H05B 47/19* (2020.01)

(58) Field of Classification Search
CPC .. G06Q 10/063; H05B 47/19; H04L 41/0816; H04L 67/535; G06T 9/001
See application file for complete search history.

(56) References Cited

U.S. PATENT DOCUMENTS

| | | | | |
|---|---|---|---|---|
| 2013/0211783 | A1* | 8/2013 | Fisher | F24F 11/30 702/182 |
| 2014/0074730 | A1* | 3/2014 | Arensmeier | G06Q 10/20 705/305 |
| 2014/0358291 | A1 | 12/2014 | Wells | |
| 2014/0375218 | A1* | 12/2014 | Leinen | H05B 47/19 315/149 |
| 2015/0136379 | A1 | 5/2015 | Takeda et al. | |
| 2016/0330746 | A1* | 11/2016 | Mehrabanzad | H04L 67/535 |
| 2018/0120776 | A1* | 5/2018 | Billings | H02J 13/0006 |
| 2018/0299846 | A1* | 10/2018 | Ray | G06Q 10/063 |
| 2019/0121338 | A1* | 4/2019 | Celia | G05B 23/0297 |
| 2020/0132324 | A1* | 4/2020 | Rigg | F24F 11/72 |
| 2021/0133929 | A1* | 5/2021 | Ackerson | G06T 9/001 |

FOREIGN PATENT DOCUMENTS

| | | |
|---|---|---|
| KR | 10-2018-0132999 | 12/2018 |
| WO | WO 2018/049244 A1 | 3/2018 |

OTHER PUBLICATIONS

Extended European Search Report dated Sep. 11, 2020, in corresponding European Patent Application No. 20169061.7.

* cited by examiner

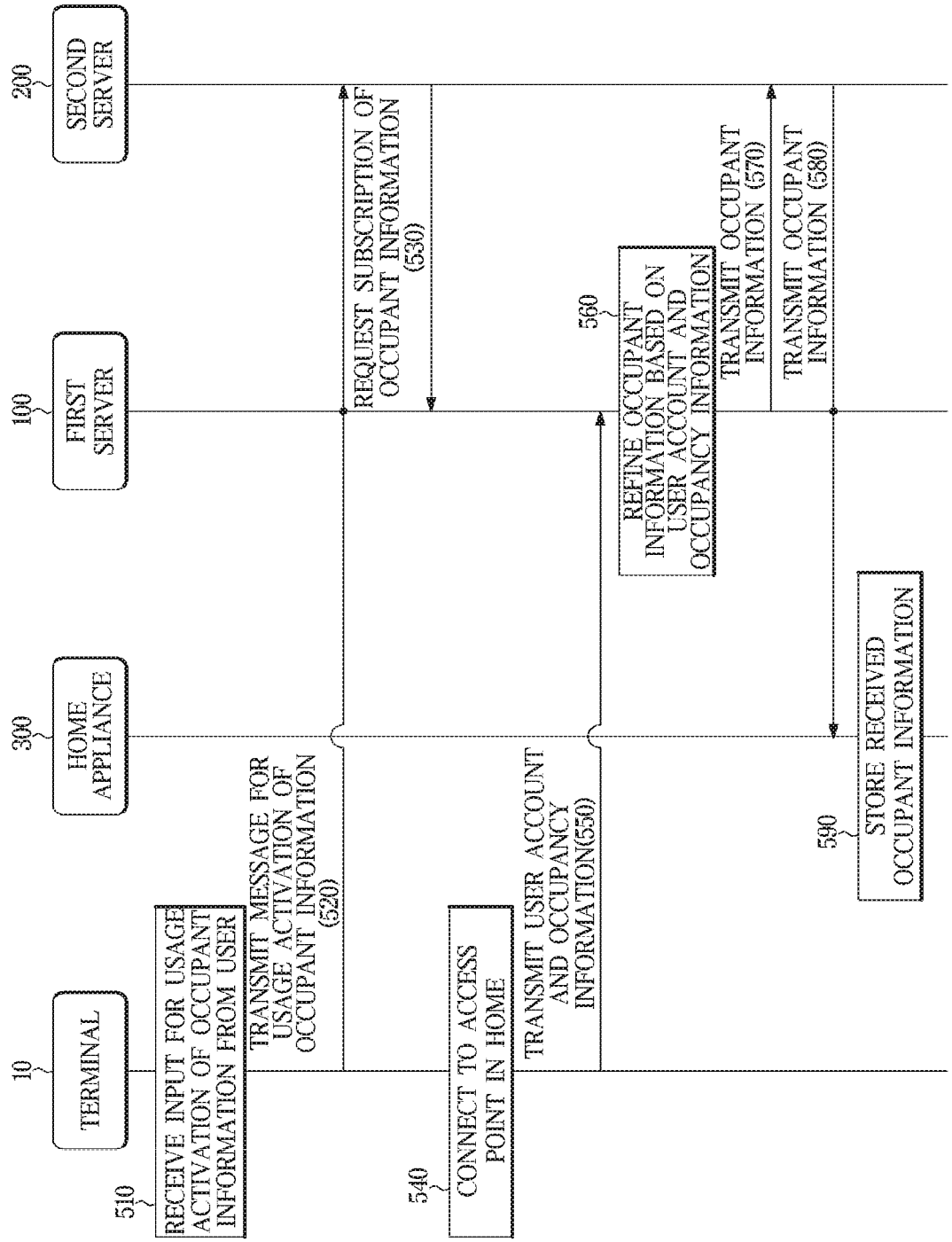

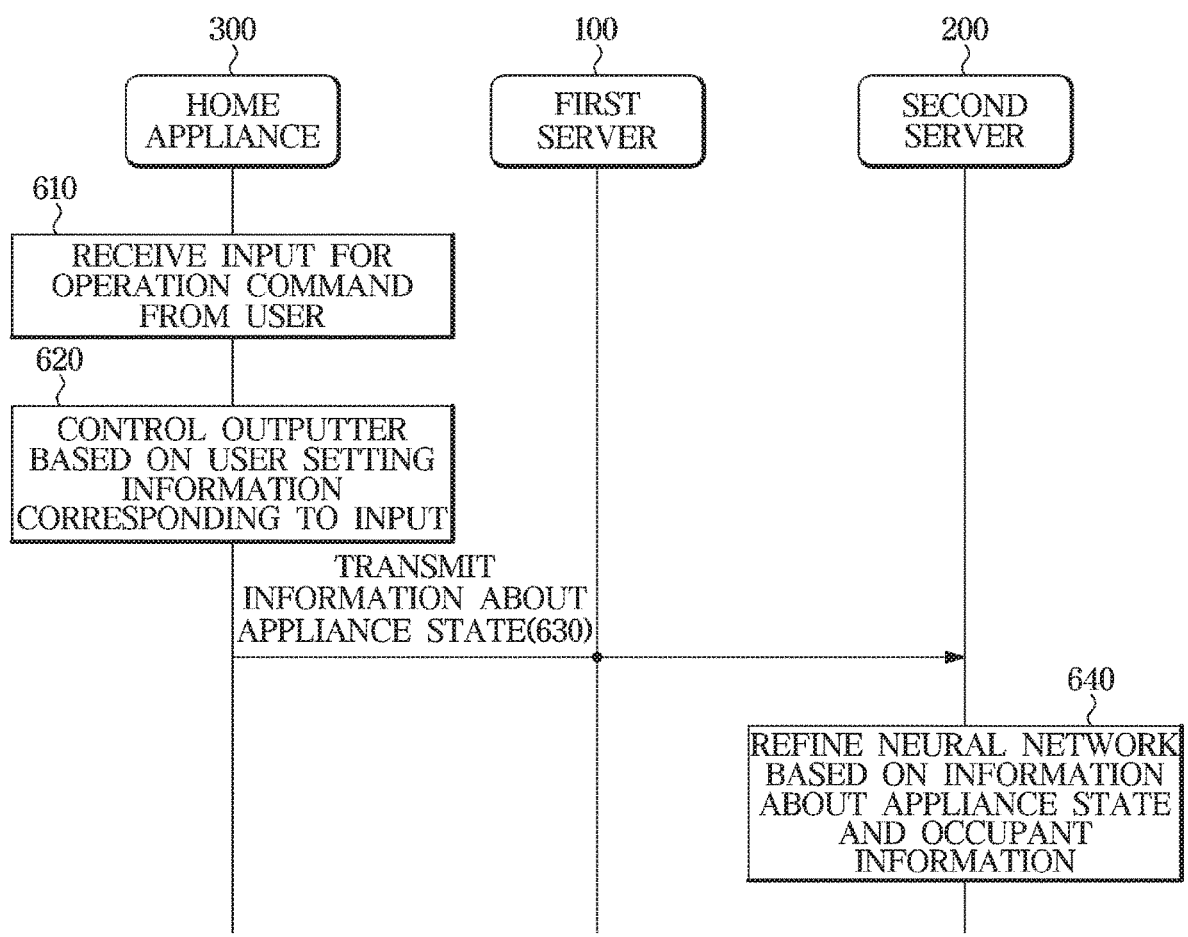

FIG. 9

| OCCUPANT INFORMATION | INDOOR TEMPERATURE (℃) | RELATIVE HUMIDITY (%) | OPERATION COMMAND (TEMPERATURE(℃) / MODE) |
|---|---|---|---|
| - | 30 | OVER 60 | AIR CONDITIONER OFF |
| A | 32 | OVER 60 | 22 / COOLING |
| B | 29 | OVER 60 | 24 / COOLING |
| C | 31 | UNDER 60 | 26 / COOLING |
| A, B | 27 | OVER 60 | 23 / COOLING |
| A, C | 26 | OVER 60 | 25 / COOLING |
| B, C | 27 | UNDER 60 | 24 / COOLING |
| A, B, C | 18 | UNDER 60 | 23 / COOLING |

HOME APPLIANCE AND CONTROL METHOD FOR THE SAME

CROSS-REFERENCE TO RELATED APPLICATION

This application is based on and claims priority under 35 U.S.C. § 119 to Korean Patent Application No. 10-2019-0042266, filed on Apr. 11, 2019 in the Korean Intellectual Property Office, the disclosure of which is incorporated by reference herein in its entirety.

BACKGROUND

1. Field

The disclosure relates to a home appliance for detecting an occupant being in home and controlling an operation according to the occupant.

2. Description of the Related Art

A home appliance is equipment placed mainly in a user's home to help the user's household chores. In general, the home appliance is fixed in a user's home and operates according to the user's operation command.

Recently, technology of enabling a home appliance to sense a user's entry and exit and performing operations corresponding to the user's entry and exit, such as automatically turning on an air conditioner or starting cooking food when a user enters home, has been developed.

However, typical home appliances determine and consider only whether a user enters or exits home, without considering occupants being in home or the number of the occupants. Therefore, the typical home appliances could not provide an operation satisfying all occupants.

SUMMARY

Therefore, it is an aspect of the disclosure to provide a home appliance of determining an operation command corresponding to an occupant through learning based on setting information of the home appliance according to the occupant to provide an operation satisfying all occupants.

Additional aspects of the disclosure will be set forth in part in the description which follows and, in part, will be obvious from the description, or may be learned by practice of the disclosure.

In accordance with an aspect of the disclosure, an air conditioner includes: an outdoor unit; and an indoor unit including a heat exchanger, wherein the indoor unit includes: a communicator configured to communicate with an access point (AP); and a controller configured to receive information about a terminal connected to the access point through the communicator, and change at least one of operation temperature or an operation mode when a new terminal is connected to the access point or a terminal connected to the access point is disconnected from the access point.

The controller may be further configured to control, when the new terminal is connected to the access point or the terminal connected to the access point is disconnected from the access point so that the terminal connected to the access point changes, the communicator to receive an output of a neural network for information about a terminal connected to the access point from an external server.

The output of the neural network may include an operation command for the at least one of the operation temperature or the operation mode.

The air conditioner may further include an inputter configured to receive an input from an occupant, wherein the controller may be further configured to control, when receiving an operation command from at least one of occupants through the inputter, the communicator to transmit the operation command to the external server.

The neural network may be refined based on the operation command and the information about the terminal connected to the access point.

The controller may be further configured to control, when an input for an Artificial Intelligence (AI) mode is received from at least one of occupants through the inputter, the communicator to transmit a message requesting the output of the neural network for the information about the terminal connected to the access point to the external server.

The air conditioner may further include a sensor configured to acquire sensing information about a surrounding environment, wherein the controller may be further configured to control the communicator to transmit the sensing information to the external server.

The sensing information may include at least one of indoor temperature, indoor humidity, outdoor temperature, or outdoor humidity.

The neural network may be refined based on the operation command, the sensing information, and the information about the terminal connected to the access point.

The controller may be further configured to control, when the new terminal is connected to the access point or the terminal connected to the access point is disconnected from the access point so that the terminal connected to the access point changes, the communicator to receive an output of the neural network for the information about the terminal connected to the access point and the sensing information from the external server.

In accordance with another aspect of the disclosure, a method of controlling an air conditioner including an outdoor unit and an indoor unit, the indoor unit including a heat exchanger and a communicator configured to communicate with an access point (AP), includes: receiving information about a terminal connected to the access point through the communicator; and changing at least one of operation temperature or an operation mode when a new terminal is connected to the access point or a terminal connected to the access point is disconnected from the access point.

The method may further include controlling, when the new terminal is connected to the access point or the terminal connected to the access point is disconnected from the access point so that the terminal connected to the access point changes, the communicator to receive an output of the neural network for information about a terminal connected to the access point from an external server.

The output of the neural network may include an operation command for at least one of operation temperature or an operation mode.

The air conditioner may further include an inputter configured to receive an input from an occupant, and the method may further include controlling, when an operation command is received from at least one of occupants through the inputter, the communicator to transmit the operation command to the external server.

The neural network may be refined based on the operation command and the information about the terminal connected to the access point.

The method may further include controlling, when an input for an Artificial Intelligence (AI) mode is received from at least one of occupants through the inputter, the communicator to transmit a message requesting an output of the neural network for the information about the terminal connected to the access point to the external server.

The air conditioner may further include a sensor configured to acquire sensing information about a surrounding environment, and the method may further include controlling the communicator to transmit the sensing information to the external server.

The sensing information may include at least one of indoor temperature, indoor humidity, outdoor temperature, or outdoor humidity.

The neural network may be refined based on the operation command, the sensing information, and the information about the terminal connected to the access point.

The method may further include controlling, when the new terminal is connected to the access point or the terminal connected to the access point is disconnected from the access point so that the terminal connected to the access point changes, the communicator to receive an output of the neural network for the information about the terminal connected to the access point and the sensing information from the external server.

In accordance with another aspect of the disclosure, a refrigerator includes: a storage room storing food; a cooler configured to cool the storage room; a communicator configured to communicate with an access point (AP); and a controller configured to receive information about a terminal connected to the access point through the communicator, and change at least one of temperature of the storage room or execution of an ice-making function when a new terminal is connected to the access point or the terminal connected to the access point is disconnected from the access point.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 shows a signal flow when a home network system according to an embodiment of the disclosure manages occupant information;

FIG. 6 shows a signal flow when a home network system according to an embodiment of the disclosure refines a neural network;

FIG. 9 shows an example of a control in an Artificial Intelligence (AI) mode of an air conditioner according to an embodiment of the disclosure;

DETAILED DESCRIPTION

Figure 1:
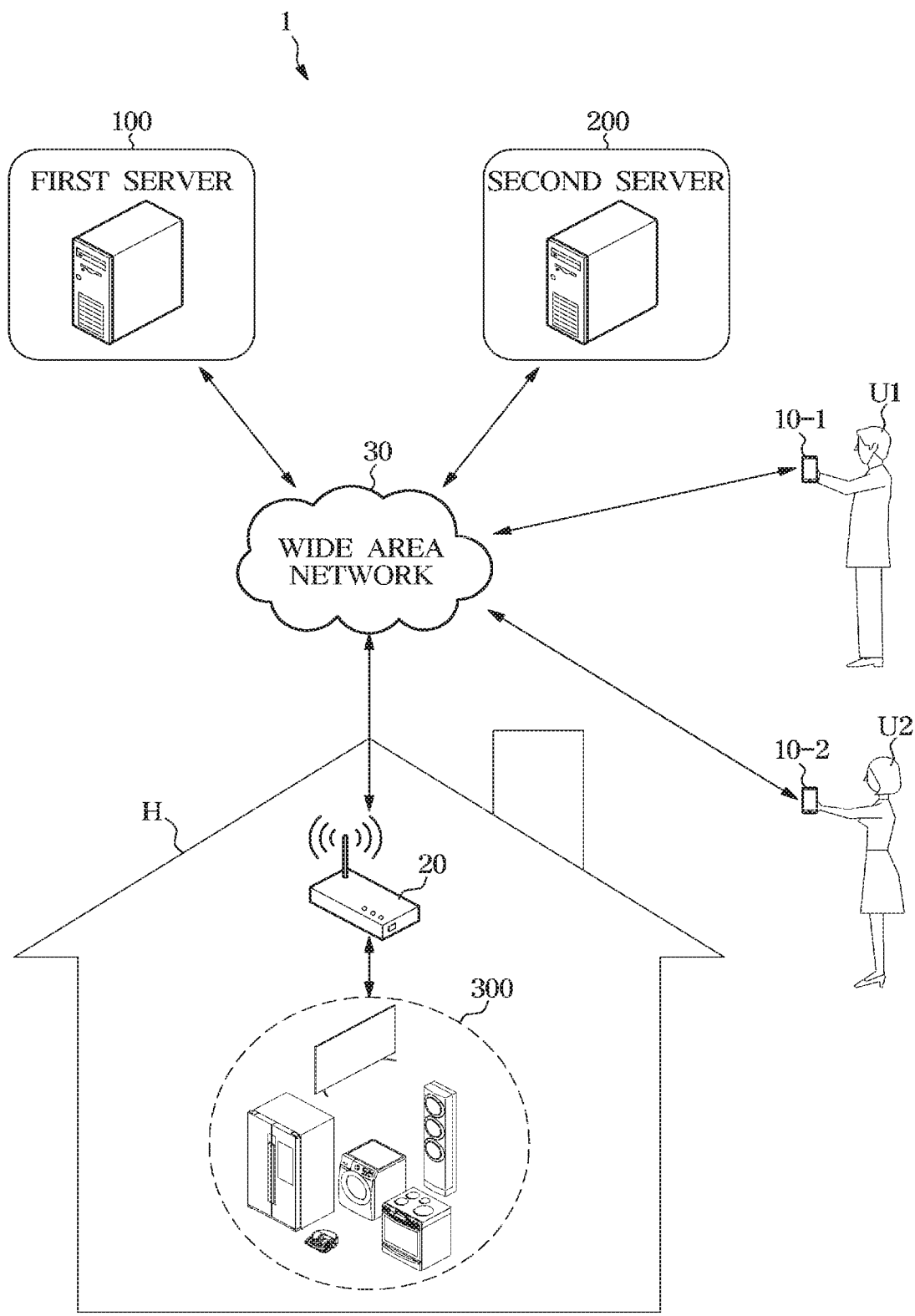
FIG. 1 shows a home network system according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

It will be understood that when a component is referred to as being "connected" to another component, it can be directly or indirectly connected to the other component. When a component is indirectly connected to another component, it may be connected to the other component through a wireless communication network.

The terms used in the present specification are merely used to describe embodiments, and are not intended to limit the disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, a second component may be termed a first component without departing from the teachings of this disclosure.

In addition, the terms "portion", "device", "block", "member", and "module" used herein refer to a unit for processing at least one function or operation. For example, the terms may mean at least one process that may be processed by at least one hardware such as field-programmable gate array (FPGA) or application specific integrated circuit (ASIC), or at least one software or processor stored in a memory.

Reference numerals used in operations are provided to identify the operations, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

Figure 2:
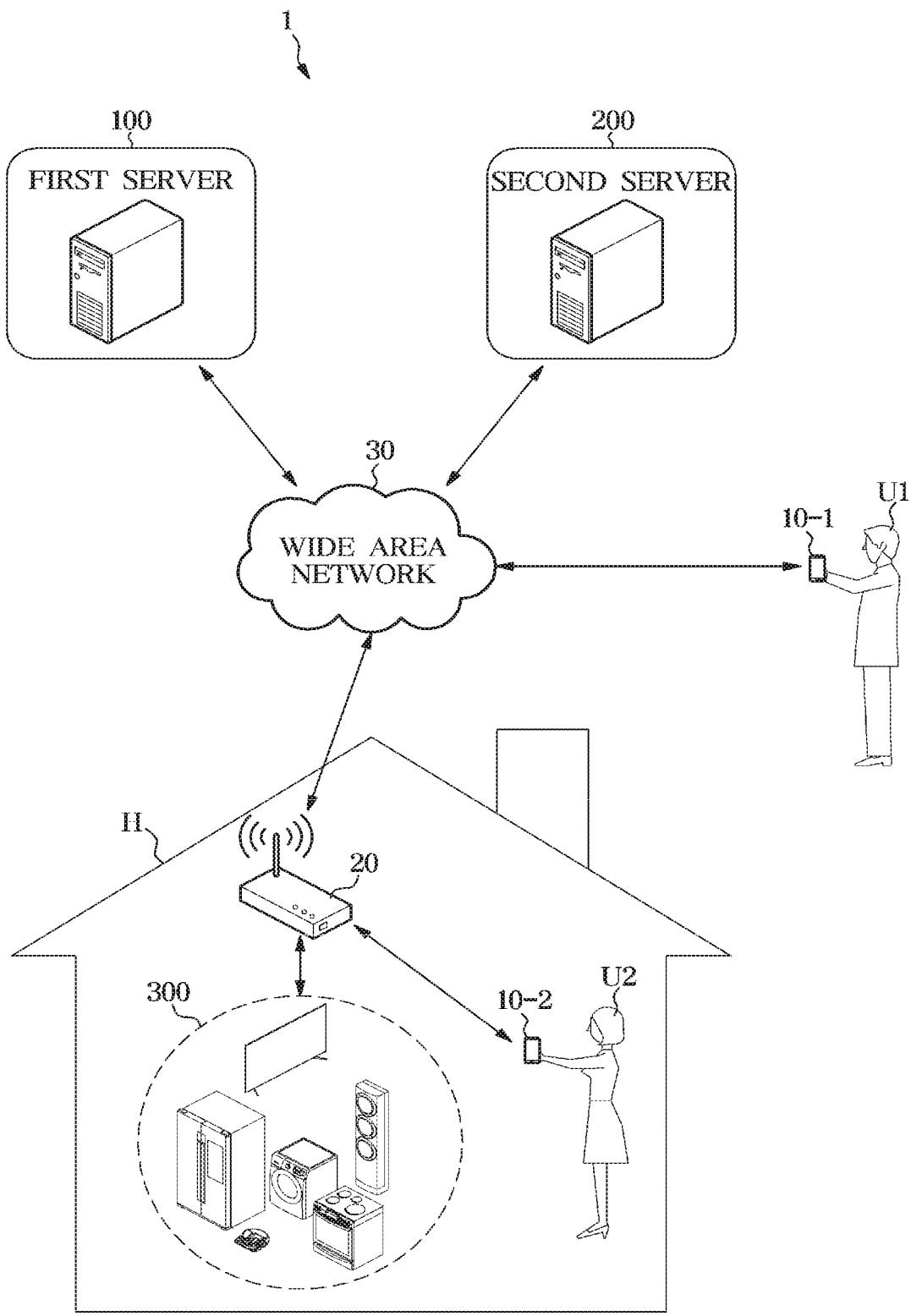
FIG. 2 shows a case in which a user's terminal is connected to an access point (AP) included in a home network system according to an embodiment of the disclosure.

FIG. 1 shows a home network system according to an embodiment of the disclosure, and FIG. 2 shows a case in which a user's terminal is connected to an access point (AP) included in the home network system according to an embodiment of the disclosure.

Referring to FIG. 1, a home network system 1 according to an embodiment of the disclosure may include a terminal 10 possessed by a user U, a home appliance 300 placed in home H, an access point 20 for connecting the terminal 10 and the home appliance 300 to a wide area network 30, a first server 100 for identifying occupants and determining the number of the occupants based on various information received from the terminal 10 through the access point 20, and a second server 200 for learning setting information of the home appliance 300 based on occupant information representing occupants and the number of the occupants to generate learning data and generating an operation command for the home appliance 300 according to the occupant information based on the learning data.

The home appliance 300 may be placed in the home H, and provide various outputs according to its kind.

More specifically, the home appliance 300 may be an air conditioner for adjusting indoor temperature in the home H, a television for outputting various multimedia information such as broadcasting signals, a refrigerator for refrigerating or freezing food, a cooker for cooking food, a washing machine for washing or drying clothes, a clothes care apparatus for drying clothes or removing dust from clothes, a robot cleaner for performing cleaning in the home H, or a speaker for outputting sound. However, the kind of the home appliance 300 is not limited to the above-mentioned examples, and may be any device capable of performing a preset operation for a user's convenience in the home H.

The home appliance 300 may be connected to the access point 20 to be connected to the wide area network 30, thereby communicating with other electronic devices, such as the first server 100 and the second server 200.

The wide area network 30 may be at least one of a telecommunications network, for example, a computer network (e.g., a local area network (LAN) or a wide area network (WAN)), the Internet, or a telephone network.

The access point 20 may be placed in the home H to connect the home appliance 300 and the terminal 10 located in the home H to the wide area network 30. That is, the home appliance 300 and the terminal 10 located in the home H may be connected to the wide area network 30 through the access point 20 to communicate with external servers (e.g., the first server 100 and the second server 200).

The access point 20 may include a wireless communication module (e.g., wireless fidelity (WiFi), Bluetooth, Bluetooth low energy (BLE), zigbee, near field communication (NFC) and wireless broadband (Wibro)) and a wired communication module (e.g., LAN and WAN).

More specifically, the access point 20 may communicate with the home appliance 300 through the wireless communication module, and be connected to the wide area network 30 through the wired communication module to communicate with the external servers 100 and 200.

At this time, the access point 20 may transmit information about a terminal connected to the access point 20 to the home appliance 300 or the external servers 100 and 200. The information about the terminal connected to the access point 20 will be described in detail, later.

The terminal 10 possessed by the user U may be a portable mobile electronic device, and may be a video phone, a mobile phone, a smart phone, a wideband code division multiple access (WCDMA) user terminal, a universal mobile telecommunication service (UMTS) user terminal, a personal digital assistant (PDA), a portable multimedia player (PMP), a digital multimedia broadcasting (DMB) user terminal, E-Book, a portable computer (e.g., a laptop computer, a tablet PC, etc.), or a digital camera.

The terminal 10 may be connected to the access point 20 in the home H according to a location of the user U possessing the terminal 10 to be connected to the wide area network 30, or may be connected to the wide area network 30 through a communication service (e.g., long term evolution (LTE), LTE advanced (LTE-A), code division multiple access (CDMA), wideband CDMA (WCDMA), UMTS, Wibro, or global system for mobile communications (GSM)). To connect to the wide area network 30 through the communication service, the terminal 10 may include wireless communication modules corresponding to the individual communication protocols.

For example, when a first user U1 and a second user U2 are located outside the home H, as shown in FIG. 1, terminals 10-1 and 10-2 of the first and second users U1 and U2 may be connected to the wide area network 30 through a communication service.

Also, when the second user U2 is located in the home H, as shown in FIG. 2, the terminal 10-2 of the second user U2 may be connected to the wide area network 30 through the access point 20 to communicate with the external servers 100 and 200.

In this case, when the terminal 10-2 of the second user U2 is connected to the access point 20, the terminal 10-2 may transmit account information of the second user U2 stored in a memory of the terminal 10-2 and occupancy information representing that the second user U2 has entered the home H to the first server 100 through the access point 20.

As such, when the terminal 10 is connected to the access point 20, the terminal 10 may transmit account information (that is, user identification information) of the user U using the terminal 10 and occupancy information representing that the user U is in the home H to the first server 100 through the access point 20.

The account information of the user U may correspond to an identifier (ID) designated in advance by the user U, and the occupancy information may correspond to information (e.g., home in and home out) representing whether or not the user U is in the home H.

Also, when the terminal 10 is disconnected from the access point 20, the terminal 10 may transmit the account information of the user U and information representing that the user U has leaved the home H to the first server 100.

That is, when the terminal 10 is connected to the access point 20, the terminal 10 may determine that the user U has entered the home H and stays in the home H, and transmit occupancy information representing that the user U is in the home H to the first server 100 through the access point 20.

However, according to some embodiments, the terminal 10 may use GPS information, a Bluetooth beacon signal, etc. to increase accuracy of a determination on whether the user U has entered the home H.

That is, the terminal 10 may store GPS information and transmission/reception sequences of Bluetooth beacon signals when the user U enters and leaves the home H, and thereafter, when the terminal 10 is connected to the access point 20, the terminal 10 may compare GPS information and a transmission/reception sequence of a Bluetooth beacon signal to the stored GPS information and the stored transmission/reception sequences of Bluetooth beacon signals, thereby determining whether the user U has entered the home H.

Accordingly, the terminal 10 may be prevented from wrongly determining that the user U has entered the home H when the user has not entered the home H, because a service set identifier (SSID) assigned to the access point 20 located in the home H is used in other access points.

The first server 100 may receive the account information of the user U and the occupancy information from the terminal 10, as described above, to identify occupants being in the home H, determine the number of the occupants, and generate occupant information representing the occupants and the number of the occupants based on the account information of the user U and the occupancy information.

Also, according to some embodiments, the first server 100 may receive information about a terminal connected to the access point 20 from the access point 20 to identify occupants being in the home H and determine the number of the occupants. That is, the information about the terminal connected to the access point 20 may include identification information of each terminal connected to the access point 20 and account information of a user using the terminal, and may correspond to occupant information.

That is, occupant information may include information about the number of occupants being in the home H, and information about who the occupants are, that is, identification information of the occupants. The occupant information may correspond to the information about the terminal connected to the access point 20.

In other words, occupant information may include identification information of each terminal connected to the access point 20 and account information of a user using the terminal.

As such, the first server 100 may recognize changes of occupants and the number of the occupants in real time to refine the occupant information in real time.

The first server 100 may transfer the occupant information to the second server 200, and transfer information about an appliance state received from the home appliance 300 to the second server 200. Also, the first server 100 may transfer an operation command for the home appliance 300 received from the second server 200 to the home appliance 300.

As such, the first server 100 may transmit/receive information to/from the terminal 10, the home appliance 300, and the second server 200, and relay transmission/reception of information between the second server 200 and the terminal 10 and between the second server 200 and the home appliance 300.

That is, the first server 100 may provide an application programming interface (API) functioning as an interface between different communication protocols.

Herein, the API may be defined as a group of subroutines or functions that a protocol is allowed to call for certain processing of another protocol. As a result, the API may provide an environment that enables a protocol to perform an operation of another protocol.

The second server 200 may receive the occupant information representing the occupants and the number of the occupants from the first server 100, and transfer the occupant information to the home appliance 300 through the first server 100.

Also, the second server 200 may receive information about an appliance state representing a state (e.g., user setting information, sensing information, etc.) of the home appliance 300 from the home appliance 300, and refine a pre-stored neural network based on the occupant information and the information about the appliance state.

At this time, the neural network may perform an operation on the occupant information, and output neural network output information including an operation command for the home appliance 300. The operation command included in the neural network output information may have been optimized for the occupants and the number of the occupants through learning. That is, the operation command included in the neural network output information may be an operation command with high frequency among operation commands set by a user with regard to the occupants and the number of the occupants corresponding to the occupant information.

That is, the second server 200 may refine the neural network based on information about a terminal connected to the access point 20 received from outside and acquire an output of the neural network for the information about the terminal connected to the access point 20 received from the outside. The neural network will be described in more detail, later.

The second server 200 may transfer the neural network output information to the home appliance 300 through the first server 100 so that the home appliance 300 operates based on the operation command output through learning.

As such, the second server 200 may receive information of the home appliance 300 through communication with the home appliance 300, and transfer an operation command to the home appliance 300. That is, the second server 200 may correspond to a server capable of controlling overall operations of the home appliance 300.

However, the first server 100 and the second server 200 may be implemented on the same hardware, which are not shown in FIGS. 1 and 2. That is, a function that is performed by the first server 100 may also be performed by the second server 200, and a function that is performed by the second server 200 may also be performed by the first server 100.

Hereinafter, the individual components constituting the home network system 1 will be described in detail.

Figure 3:
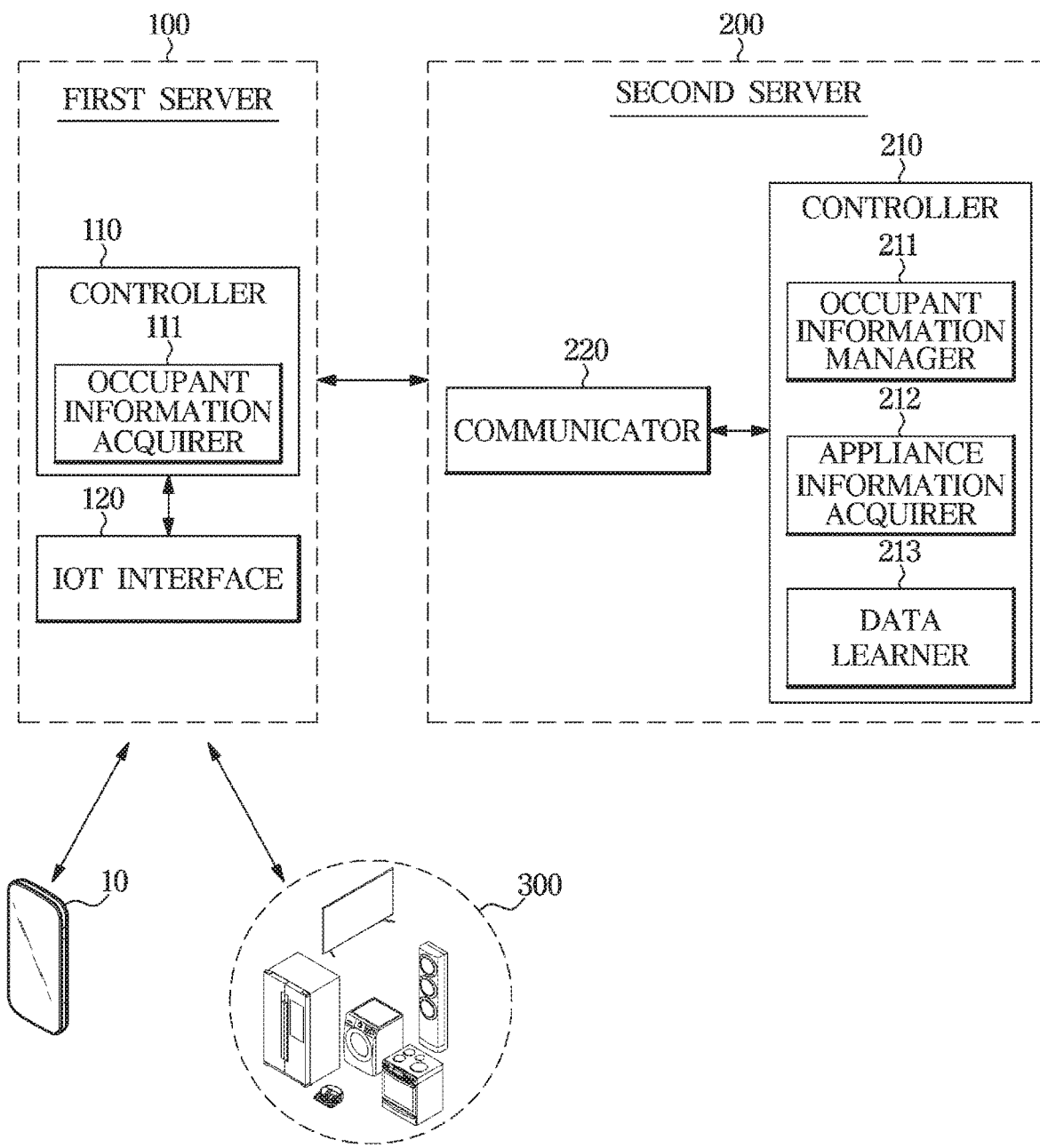
FIG. 3 is a control block diagram of a first server and a second server according to an embodiment of the disclosure.

FIG. 3 is a control block diagram of the first server 100 and the second server 200 according to an embodiment of the disclosure.

Referring to FIG. 3, the first server 100 according to an embodiment of the disclosure may include a controller 110 for controlling overall operations of the first server 100, and an IOT interface 120 for communicating with the terminal 10, the second server 200, and the home appliance 300.

The controller 110 may include an occupant information acquirer 111 for acquiring occupant information representing occupants being in home H and the number of the occupants.

The occupant information acquirer 111 according to an embodiment of the disclosure may control the IOT interface 120 to receive account information of a user and occupancy information from the terminal 10.

As described above, when the terminal 10 is connected to the access point 20 located in the home H, the terminal 10 may transmit account information of a user and occupancy information to the first server 100 through the access point 20.

The occupant information acquirer 111 may generate or refine occupant information based on the account information of the user and the occupancy information received from the terminal 10.

That is, when the occupant information acquirer 111 acquires occupancy information representing that the user of the terminal 10 has entered the home H from the terminal 10, the occupant information acquirer 111 may refine occupant information such that the occupant information includes information representing that the user identified through the account information of the user is in the home H.

Also, when the occupant information acquirer 111 acquires occupancy information representing that the user of the terminal 10 has left the home H from the terminal 10, the occupant information acquirer 111 may refine occupant information such that the occupant information includes information representing that the user identified through the account information of the user is out of the home H.

That is, the occupant information may include information about members currently being in the home H and information about the number of the members.

According to an embodiment of the disclosure, the occupant information acquirer 111 may refine the occupant information, based on information about a history of Bluetooth connections to the terminal 10 and information about a usage history of the home appliance 300, transmitted from the home appliance 300.

That is, when the occupant information acquirer 111 receives a Bluetooth connection history representing that a Bluetooth connection to the terminal 10 is established, the occupant information acquirer 111 may refine the occupant information such that the occupant information includes information representing that a user of the terminal 10 is in the home H. When the occupant information acquirer 111 receives information representing that a home appliance 300 matching with a user is being used from the home appliance 300, the occupant information acquirer 111 may refine the occupant information such that the occupant information includes information representing that the user of the home appliance 300 is in the home H.

The occupant information acquirer 111 according to an embodiment of the disclosure may receive information about a terminal connected to the access point 20 from the access point 20 through the IOT interface 120.

Herein, the information about the terminal connected to the access point 20 may include identification information of each terminal connected to the access point 20 and account information of a user using the terminal, and may correspond to the occupant information.

As such, the occupant information acquired by the occupant information acquirer 111 based on information received from the terminal 10 may correspond to the information about the terminal connected to the access point 20.

The occupant information acquirer 111 may control the IOT interface 120 to transmit the occupant information acquired as described above to the second server 200.

Whenever the occupant information is refined according to changes of occupants and the number of the occupants, the occupant information acquirer 111 may control the IOT interface 120 to transmit the refined occupant information to the second server 200.

In this case, according to some embodiments, the occupant information acquirer 111 may transmit the occupant information to the second server 200, when receiving a message requesting a subscription of the occupant information from the second server 200.

Also, the controller 110 may control the IOT interface 120 to relay transmission/reception of information between the terminal 10 and the second server 200 and between the home appliance 300 and the second server 200.

The controller 110 may include at least one memory storing programs for performing the above-described operations and operations that will be described later, and at least one processor for executing the stored programs.

The IOT interface 120 may provide an API functioning as an interface between different communication protocols, and transmit/receive information to/from the terminal 10, the second server 200, and the home appliance 300 through the wide area network 30.

That is, the IOT interface 120 may be connected to the wide area network 30 through wired or wireless communication to communicate with the terminal 10, the second server 200, and the home appliance 300.

The wireless communication may be cellular communication using at least one of, for example, LTE, LTE-A, CDMA, WCDMA, UMTS, Wibro, or GSM.

According to an embodiment, the wireless communication may include at least one of, for example, WiFi, Bluetooth, BLE, zigbee, NFC, magnetic secure transmission, radio frequency (RF), or a body area network (BAN). According to an embodiment, the wireless communication may include global navigation satellite system (GNSS).

The wired communication may include at least one of, for example, a universal serial bus (USB), a high definition multimedia interface (HDMI), recommended standard-232 (RS-232), power line communication, or plain old telephone service (POTS).

The second server 200 according to an embodiment of the disclosure may include a controller 210 for controlling overall operations of the second server 200, and a communicator 220 for communicating with the first server 100.

The controller 210 according to an embodiment of the disclosure may include an occupant information manager 211 storing occupant information, an appliance information acquirer 212 storing information about an appliance state received from the home appliance 300 to acquire learning data, and a data learner 213 for refining a pre-stored neural network based on the information about the appliance state and performing an operation on the occupant information through the neural network to generate neural network output information including an operation command for the home appliance 300.

The occupant information manager 211 according to an embodiment of the disclosure may store occupant information received from the first server 100 through the communicator 220. At this time, the occupant information manager 211 may receive occupant information refined according to a change of occupants from the first server 100, and store and manage the occupant information. That is, the occupant information manager 211 may acquire occupant information representing occupants currently being in the home H and the number of the occupants.

According to an embodiment, the occupant information manager 211 may transmit a message requesting a subscription of occupant information to the first server 100 to request transmission of the occupant information.

More specifically, when the occupant information manager 211 receives a message requesting usage activation of occupant information from the terminal 10 or the home appliance 300 through the first server 100, the occupant information manager 211 may transmit a message requesting a subscription of occupant information to the first server 100.

That is, the user may input a request for activating use of occupant information through an inputter of the terminal 10 or an inputter of the home appliance 300. In this case, the second server 200 may acquire the occupant information and share the acquired occupant information with the home appliance 300, thereby learning data based on information about an appliance state including user setting information, sensing information, etc. of the home appliance 300 to generate learning data and sensing information and outputting an operation command for the home appliance 300 based on the learning data.

The occupant information manager 211 according to an embodiment of the disclosure may control the communicator 220 to transmit the acquired occupant information to the home appliance 300. In this case, the occupant information may be transferred to the home appliance 300 through a relay of the first server 100.

Whenever the occupant information is refined according to a change of the occupants, the occupant information manager 211 may control the communicator 220 to transmit the refined occupant information to the home appliance 300.

However, according to some embodiments, the home appliance 300 may receive information about a terminal connected to the access point 20, corresponding to occupant information, from the access point 20.

The appliance information acquirer 212 according to an embodiment of the disclosure may receive information about an appliance state corresponding to occupant information from the home appliance 300 through the first server 100.

Herein, the information about the appliance state may include at least one of user setting information representing an operation command input from at least one of occupants through the home appliance 300 or sensing information about a surrounding environment acquired by the home appliance 300.

That is, by acquiring user setting information and sensing information corresponding to occupant information in a normal mode in which the home appliance 300 operates according to an operation command input from a user, the appliance information acquirer 212 may refine a neural network that outputs an operation command for the home appliance 300 by performing an operation on occupant information in an artificial intelligence (AI) mode.

In other words, when an occupant represented by occupant information is in the home H, the appliance information acquirer 212 may receive setting information of the home appliance 300 input by the occupant and sensing information about a surrounding environment acquired by the home appliance 300 to secure data for learning the neural network.

The data learner 213 according to an embodiment of the disclosure may refine the neural network based on the information about the appliance state and the occupant information.

The neural network may be machine learning that images a neural structure capable of performing deep learning, wherein weights and biases corresponding to configurations of the neural network continue to change to improve the reliability of learning.

That is, the data learner 213 may continue to refine weights and biases corresponding to configurations of the neural network based on the information about the appliance state and the occupant information acquired through the appliance information acquirer 212.

In other words, the data learner 213 may continue to refine weights, biases, and activation functions included in the neural network based on information about a terminal connected to the access point 20 located in the home H and an operation command input from at least one of occupants being in the home H to improve an inference result of the neural network.

However, the data learner 213 may refine the neural network based on occupant information, sensing information, and user setting information corresponding to the occupant information and the sensing information. That is, the data learner 213 may refine the neural network by further considering sensing information in addition to information about a terminal connected to the access point 20 and an operation command.

Thereby, the neural network may output neural network output information including an operation command for the home appliance 300 based on the occupant information in the AI mode in which no operation command is input from a user. Also, according to some embodiments, the neural network may output neural network output information further considering sensing information in addition to the occupant information.

The neural network may be stored in a form of a computer program in the data learner 213. Hereinafter, an operation that is processed by the neural network will be described in a form of coding of a computer program, however, the neural network is not limited to a stored computer program.

Meanwhile, the neural network may be a convolution neural network (CNN) that performs convolution on the occupant information and the information about the appliance state to generate a feature map and inputs the feature map to a neural network, although not limited thereto. However, the neural network may be performed by other deep learning algorithms including recurrent neural networks (RNNs). That is, the type of the neural network is not limited.

The data learner 213 according to an embodiment of the disclosure may acquire neural network output information including an operation command for the home appliance 300 by performing an operation on the occupant information through the neural network.

More specifically, when the data learner 213 receives a request for an output of the neural network from the home appliance 300, the data learner 213 may acquire neural network output information.

In other words, the data learner 213 may acquire neural network output information by performing an operation on information about a terminal connected to the access point 20 through the neural network.

Herein, the neural network output information may correspond to information acquired when the neural network learned based on occupant information and information about an appliance state performs an operation on occupant information, and the neural network output information may include an operation command for the home appliance 300, the operation command being optimized for the occupant information.

That is, the operation command included in the neural network output information may be an operation command with high frequency among operation commands set by a user with regard to the occupants and the number of the occupants corresponding to the occupant information.

According to some embodiments, the data learner 213 may acquire neural network output information by further considering sensing information received together with a request for an output of the neural network from the home appliance 300 in addition to the occupant information.

That is, the data learner 213 may perform an operation on the information about the terminal connected to the access point 20 and the sensing information through the neural network to acquire neural network output information.

The data learner 213 according to an embodiment of the disclosure may transmit the acquired neural network output information to the home appliance 300 via the first server 100. Accordingly, the home appliance 300 may operate based on the operation command of the neural network output information optimized for the occupants and the number of the occupants, although receiving any operation command from an occupant.

When the occupant information is refined according to a change of the occupants, the data learner 213 may again perform an operation on the refined occupant information through the neural network to refine the neural network output information, and control the communicator 220 to transmit the refined neural network output information to the home appliance 300.

That is, the data learner 213 may reflect a change of the occupants according to entry or exit of an occupant to/from home H in real time so that the home appliance 300 operates according to an operation command optimized for occupants currently staying in the home H and the number of the occupants. The controller 210 may include at least one memory storing a program for performing the above-described operations and operations which will be described later, and at least one processor for executing the stored program.

The communicator 220 according to an embodiment of the disclosure may transmit/receive information to/from the first server 100 through the wide area network 30, and finally transmit/receive information to/from the terminal 10 and the home appliance 300 through the first server 100.

That is, the communicator 220 may be connected to the wide area network 30 through wireless or wired communication to communicate with the first server 100, and communicate with the terminal 10 and the home appliance 300 through the first server 100. The wireless and wired communications that are used by the communicator 220 may correspond to a communication protocol of the same type as a communication protocol that is used by the IOT interface 120.

Figure 4A:
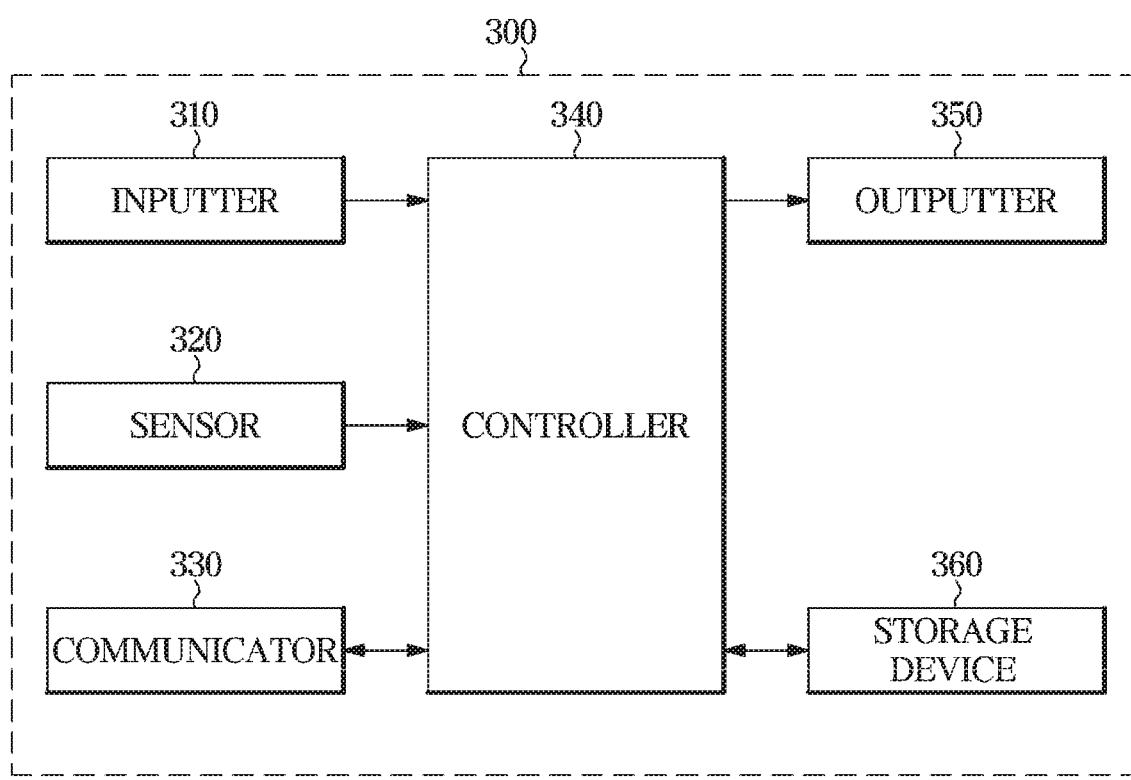
FIG. 4A is a control block diagram of a home appliance according to an embodiment of the disclosure.

FIG. 4A is a control block diagram of the home appliance 300 according to an embodiment of the disclosure.

Referring to FIG. 4A, the home appliance 300 may include an inputter 310 for receiving an operation command from a user, a sensor 320 for sensing a surrounding environment of the home appliance 300, a communicator 330 for communicating with an external device, a controller 340 for controlling overall operations of the home appliance 300, an outputter 350 operating according to an operation command, and a storage device 360 storing various information.

The inputter 310 according to an embodiment of the disclosure may receive various inputs from a user.

For example, the inputter 310 may receive an input for an operation command of the home appliance 300 from the user.

The operation command of the home appliance 300 may include information about an operation mode and operation content (e.g., setting temperature) of the home appliance 300.

Also, the inputter 310 may receive an input for usage activation of occupant information from the user. In this case, the home appliance 300 may transmit a message for usage activation of the occupant information to the second server 200 through the communicator 330 to enable the second server 200 to acquire the occupant information and refine the neural network based on the occupant information or to acquire neural network output information by performing an operation through the neural network.

Also, the inputter 310 may receive an input for the AI mode from the user. In this case, the home appliance 300 may transmit at least one of a request message for neural network output information or sensing information through the communicator 330, and receive neural network output information corresponding to a result of performing an operation on occupant information through the neural network from the second server 200.

Herein, the neural network output information may include an operation command for the home appliance 300, as described above, to enable the home appliance 300 to perform an operation corresponding to the occupant information.

As such, the inputter 310 may receive various inputs from the user. To receive an input from the user, the inputter 310 may include a button type switch, a membrane switch, a touch panel, or a control panel.

The sensor 320 according to an embodiment of the disclosure may sense a surrounding environment of the home appliance 300, and output sensing information including information about the surrounding environment of the home appliance 300. For example, the sensor 320 may measure indoor temperature, indoor humidity, etc. of a space where the home appliance 300 is placed, and also measure outdoor temperature, outdoor humidity, etc. of outside where an outdoor unit of the home appliance 300 is placed.

To measure temperature and humidity, the sensor 320 may include a thermistor of which electrical resistance changes according to temperature, and include an electronic hygrometer that measures humidity by measuring capacitance of a capacitor made of a polymer or oxide of which a dielectric constant changes according to humidity.

The communicator 330 according to an embodiment of the disclosure may transmit/receive information to/from the terminal 10, the access point 20, the first server 100, and the second server 200.

That is, the communicator 330 may be connected to the wide area network 30 through wireless or wired communication to communicate with the terminal 10 and the first server 100, and communicate with the second server 200 through the first server 100. Also, the communicator 330 may communicate with the access point 20 connected to the home appliance 300. The wired and wireless communications that are used by the communicator 330 may correspond to a communication protocol of the same type as a communication protocol that is used by the IOT interface 120.

The controller 340 according to an embodiment of the disclosure may control the outputter 350 based on an operation command input from a user, or based on an output from the neural network without receiving any input from the user.

When the controller 340 according to an embodiment of the disclosure controls the outputter 350 based on an operation command input from the user, the controller 340 may control the communicator 330 to receive occupant information from the second server 200.

Also, the controller 340 according to an embodiment of the disclosure may receive information about a terminal connected to the access point 20, the information corresponding to occupant information, from the access point 20.

The controller 340 may acquire information about an appliance state corresponding to occupant information, and control the communicator 330 to transmit the information about the appliance state to the second server 200.

In this case, the information about the appliance state may include at least one of user setting information representing an operation command input by at least one of occupants through the inputter 310 or sensing information about a surrounding environment acquired by the sensor 320.

That is, when an occupant corresponding to occupant information (that is, information about occupants and the number of the occupants) is in home H, the controller 340 may acquire setting information input through the inputter 310, that is, information for an operation command and sensing information about a surrounding environment acquired by the sensor 320, and transmit the setting information and the sensing information to the second server 200.

Then, the second server 200 may refine a pre-stored neural network based on the occupant information and information about an appliance state corresponding to the occupant information, and perform an operation on the occupant information through the neural network to acquire neural network output information including an operation command corresponding to the occupant information.

When the controller 340 receives occupant information refined according to a change of occupants, that is, changed information about a terminal connected to the access point 20 from the second server 200 or the access point 20 through the communicator 330, the controller 340 may transmit information about an appliance state corresponding to the refined occupant information to the second server 200 to enable the second server 200 to continue to refine the neural network according to the change of the occupants.

In other words, when a new terminal is connected to the access point 20 or a terminal connected to the access point 20 is disconnected from the access point 20 so that the information about the terminal connected to the access point 20 changes, the controller 340 may transmit information about an appliance state corresponding to the changed information about the terminal connected to the access point 20 to the second server 200.

When the controller 340 according to an embodiment of the disclosure controls the outputter 350 based on an output of the neural network without receiving any input from the user, the controller 340 may control the communicator 330 to receive neural network output information including an operation command obtained by performing an operation on occupant information from the second server 200 including a neural network refined based on occupant information and information about an appliance state. In this case, the controller 340 may control the outputter 350 based on the neural network output information.

Also, according to some embodiments, the controller 340 may receive neural network output information further considering sensing information in addition to the occupant information. More specifically, the controller 340 may control the communicator 330 to receive neural network output information including an operation command obtained by performing an operation on occupant information and sensing information from the second server 200.

Also, according to some embodiments, the controller 340 may control the communicator 330 to receive neural network output information corresponding to occupant information refined according to a change of occupants from the second server 200. That is, in the AI mode that controls the outputter 350 based on an output of the neural network without receiving any input from a user, the home appliance 300 may receive neural network output information that is output based on occupant information including information about occupants and the number of the occupants refined in real time according to a change of the number of the occupants, and control the outputter 350 to correspond to the occupant information based on the received neural network output information.

That is, the controller 340 may receive information about a terminal connected to the access point 20 through the communicator 330, and when a new terminal is connected to the access point 20 or a terminal connected to the access point 20 is disconnected from the access point 20, the controller 340 may change an operation of the outputter 350.

More specifically, when a new terminal is connected to the access point 20 or a terminal connected to the access point 20 is disconnected from the access point 20 so that the terminal connected to the access point 20 changes, the controller 340 may control the communicator 330 to receive an output of the neural network for changed information about a terminal connected to the access point 20 from the second server 200. Also, the controller 340 may control the communicator 330 to receive an output of the neural network further considering sensing information in addition to the changed information about the terminal connected to the access point 20 from the second server 200.

In this case, the neural network output information, that is, the output of the neural network may include an operation command for an operation (for example, an operation mode, operation temperature, etc.) of the outputter 350.

Also, when the controller 340 receives an input for the AI mode from at least one of occupants through the inputter 310, the controller 340 may control the communicator 330 to transmit at least one of the sensing information or a request message for neural network output information to the second server 200.

Then, the second server 200 may transmit neural network output information corresponding to information about occupants currently being in the home H to the home appliance 300, based on the at least one of the sensing information or the request message for neural network output information, received from the home appliance 300.

The controller 340 may include at least one memory storing a program for performing the above-described operations and operations that will be described later, and at least one processor for executing the stored program.

The outputter 350 according to an embodiment of the disclosure may operate based on an operation command input from a user through the inputter 310 or an operation command received from the second server 200 through the communicator 330. At this time, the outputter 350 may output different types of operations according to the kind of the home appliance 300.

That is, the outputter 350 may operate according to a user's input, and, in the AI mode, the outputter 350 may operate to correspond to occupants being in the home H and the number of the occupants. The outputter 350 will be described in more detail with reference to control block diagrams according to kinds of home appliances, later.

The storage device 360 according to an embodiment of the disclosure may store user setting information for an operation command input through the inputter 310, information about a surrounding environment measured by the sensor 320, occupant information received through the communicator 330, and control information for the outputter 350 according to the operation command.

Also, according to some embodiments, the storage device 360 may store a neural network, and in this case, the controller 340 may refine the neural network based on occupant information and information about an appliance state, and acquire neural network output information by performing an operation on the occupant information through the refined neural network.

However, according to some embodiments, the storage device 360 may receive, instead of itself learning a neural network based on collected data, a neural network learned by the second server 200, that is, a neural network refined based on occupant information and information about an application state, from the second server 200, and store the neural network. In this case, the controller 340 may acquire neural network output information by performing an operation through the received neural network.

That is, the storage device 360 may have stored a neural network that is learned based on collected data, in advance, or may receive a learned neural network from an external server.

As such, to store various information, the storage device 360 may be implemented as at least one of a non-volatile memory device (e.g., a cache, Read Only Memory (ROM), Programmable ROM (PROM), Erasable Programmable ROM (EPROM), Electrically Erasable Programmable ROM (EEPROM), and flash memory), a volatile memory device (e.g., Random Access Memory (RAM)), or a storage medium, such as Hard Disk Drive (HDD) and Compact Disc Read Only Memory (CD-ROM), although not limited thereto. However, the storage device 360 may be any device capable of storing various information.

Hereinafter, control block diagrams according to kinds of home appliances will be described. Inputters 310-1 to 310-5, sensors 320-1 to 320-5, communicators 330-1 to 330-5, controllers 340-1 to 340-5, outputters 350-1 to 350-5, and storage devices 360-1 to 360-5 included in home appliances 300-1 to 300-5 may respectively correspond to the inputter 310, the sensor 320, the communicator 330, the controller 340, the outputter 350, and the storage device 360 described above with reference to FIG. 4A, and therefore, overlapping descriptions will be omitted.

Figure 4B:
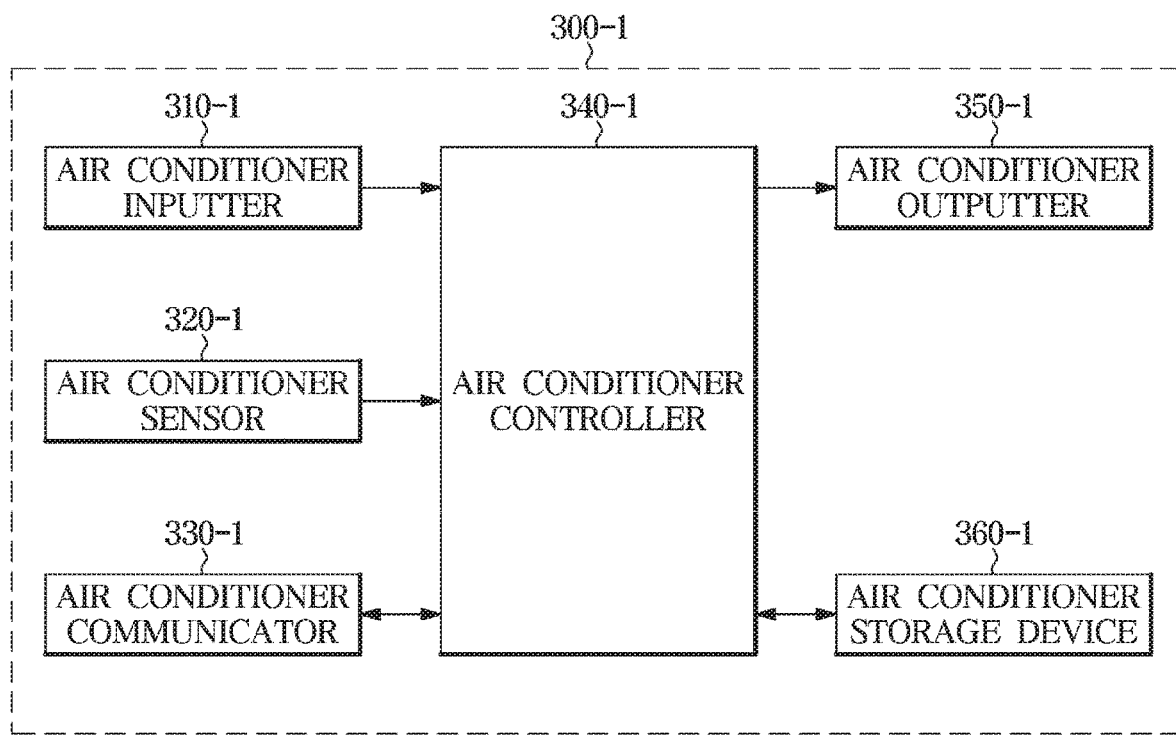
FIG. 4B is a control block diagram of an air conditioner according to an embodiment of the disclosure.
Figure 4C:
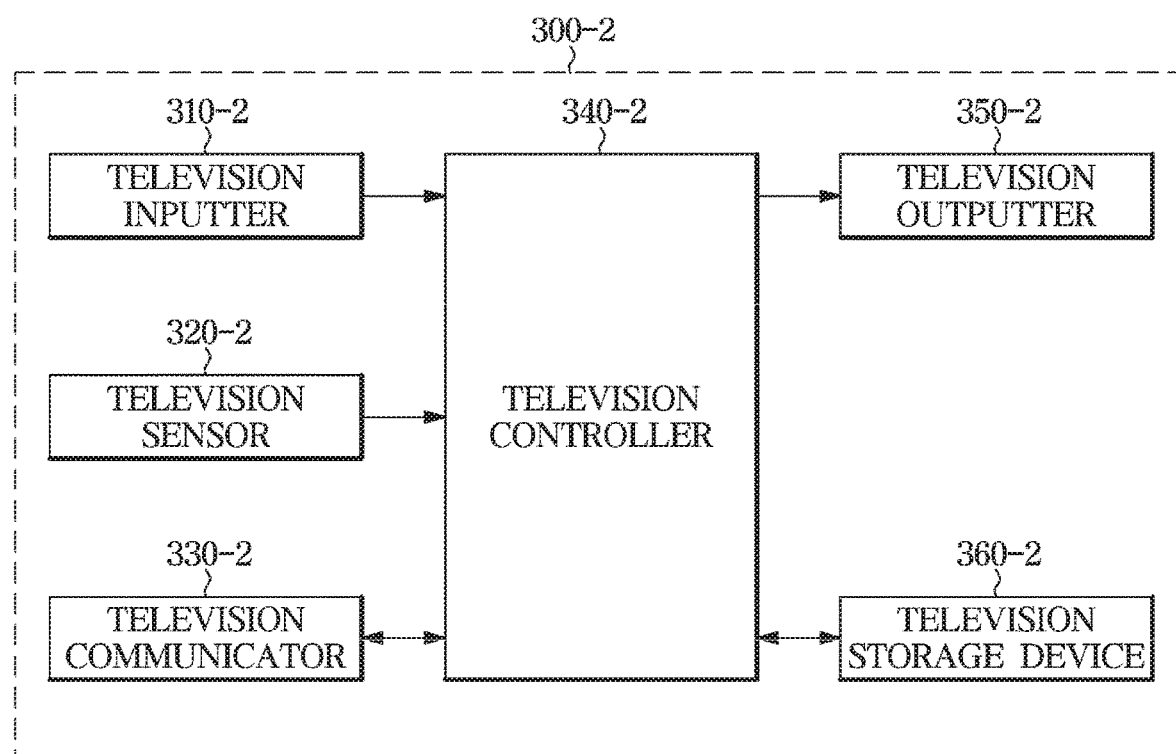
FIG. 4C is a control block diagram of a television according to an embodiment of the disclosure.
Figure 4D:
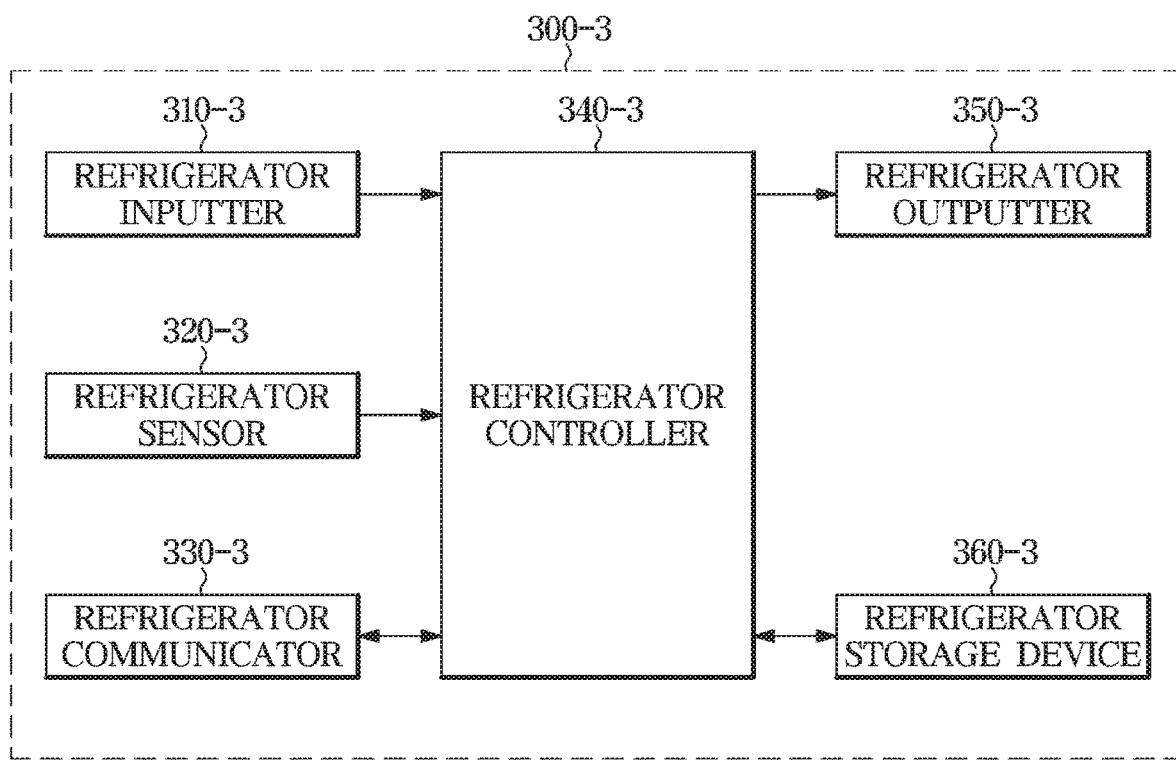
FIG. 4D is a control block diagram of a refrigerator according to an embodiment of the disclosure.
Figure 4E:
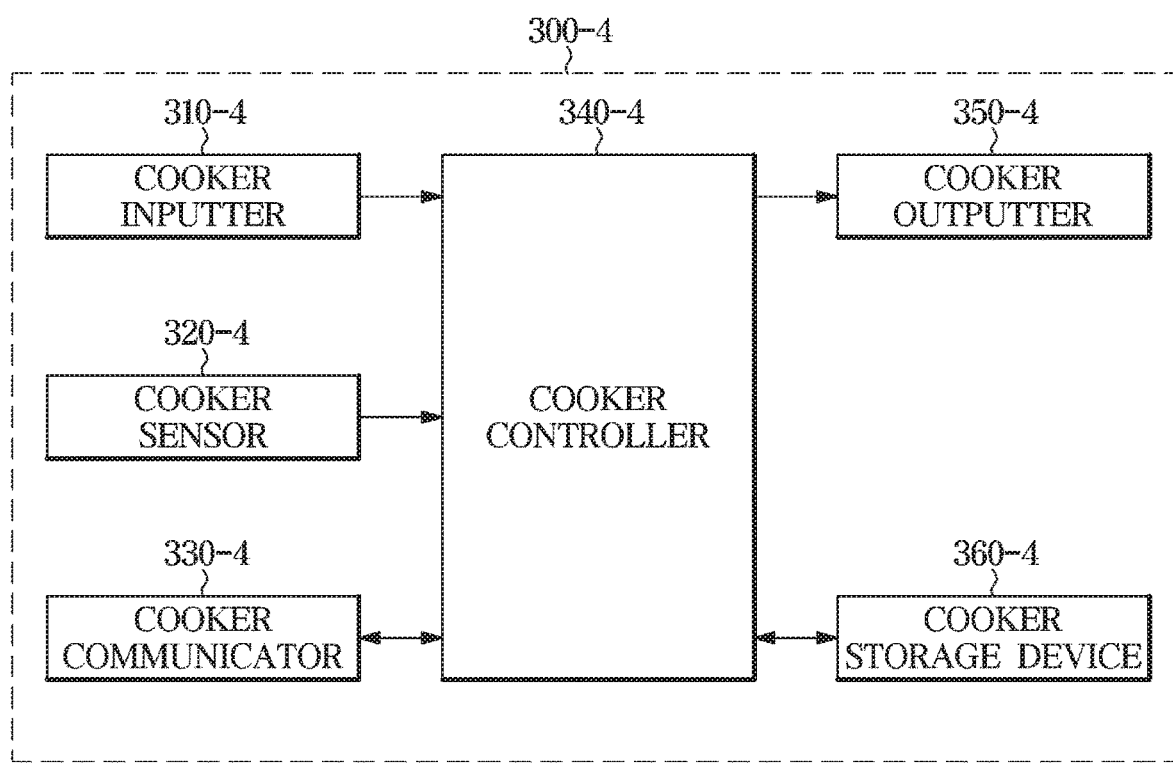
FIG. 4E a control block diagram of a cooker according to an embodiment of the disclosure.
Figure 4F:
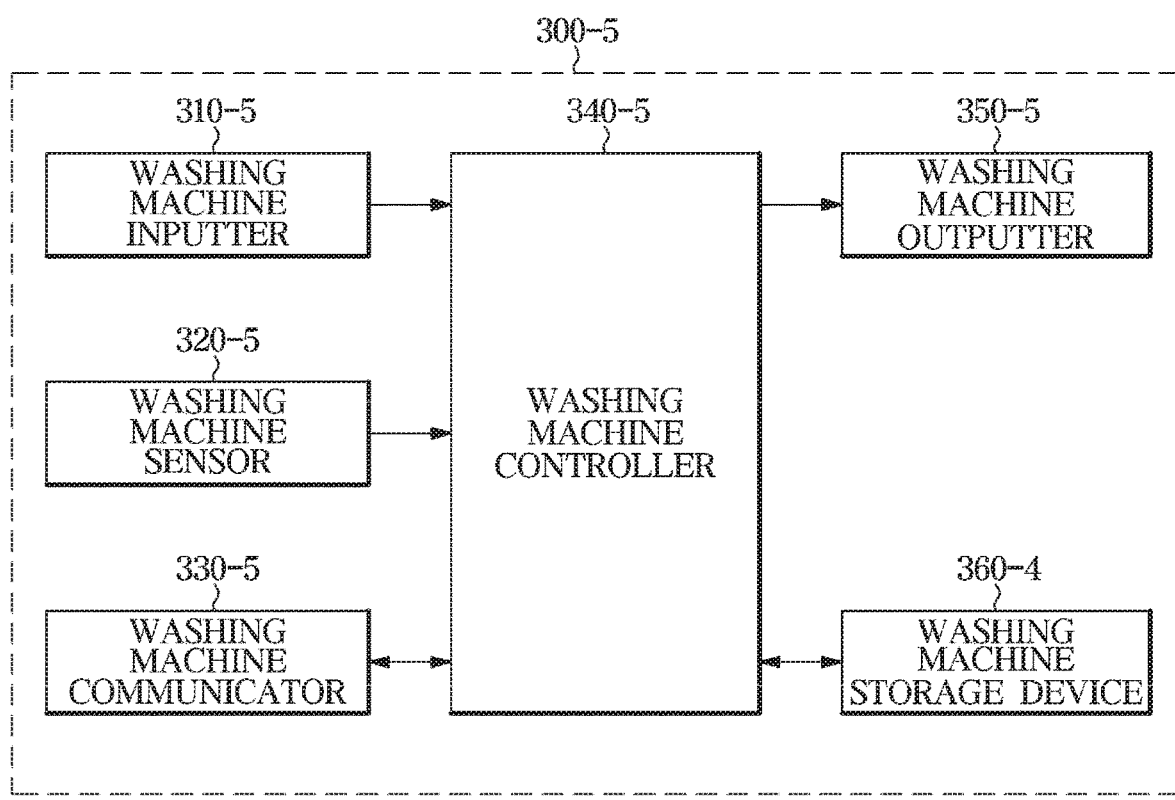
FIG. 4F is a control block diagram of a washing machine according to an embodiment of the disclosure.

FIG. 4B is a control block diagram of an air conditioner according to an embodiment of the disclosure, FIG. 4C is a control block diagram of a television according to an embodiment of the disclosure, FIG. 4D is a control block diagram of a refrigerator according to an embodiment of the disclosure, FIG. 4E is a control block diagram of a cooker according to an embodiment of the disclosure, and FIG. 4F is a control block diagram of a washing machine according to an embodiment of the disclosure.

Referring to FIG. 4B, an air conditioner 300-1 according to an embodiment of the disclosure may include an air conditioner inputter 310-1 for receiving an operation command for the air conditioner 300-1, an air conditioner sensor 320-1 for detecting indoor temperature, indoor humidity, outside temperature, outside humidity, etc., an air conditioner communicator 330-1 for communicating with the access point 20 to be connected to the wide area network 30, an air conditioner controller 340-1 for controlling overall operations of the air conditioner 300-1, an air conditioner outputter 350-1 including an air conditioner heat exchanging portion for adjusting indoor temperature, and an air conditioner storage device 360-1 storing a program and data related to operations of the air conditioner 300-1.

The air conditioner 300-1 may include an indoor unit (not shown) placed outside home H, that is, in an outdoor space to perform heat exchange between outside air and refrigerants, and an indoor unit (not shown) placed inside the home H, that is, in an indoor space to perform heat exchange between indoor air and refrigerants.

A main body (not shown) of the indoor unit (not shown) may include the air conditioner inputter 310-1, and include the air conditioner sensor 320-1 capable of measuring indoor temperature and indoor humidity. Also, the indoor unit (not shown) may include the air conditioner communicator 330-1, the air conditioner controller 340-1, the air conditioner outputter 350-1, and the air conditioner storage device 360-1.

The air conditioner outputter 350-1 included in the indoor unit (not shown) may include an indoor heat exchanging portion, and an outlet (not shown) located in a front side of the main body (not shown) to discharge heat-exchanged air.

The indoor heat exchanging portion of the air conditioner outputter 350-1 included in the indoor unit (not shown) may include a flowpath (not shown) in which refrigerants circulate, an expander (not shown) for decompressing refrigerators, and an indoor heat exchanger (not shown) for performing heat exchange between refrigerators and indoor air.

The outdoor unit (not shown) may be connected to the indoor unit (not shown) through a liquid pipe (not shown) through which liquid refrigerators flow and a gas pipe (not shown) through which gas refrigerators flow, and include an air conditioner sensor 320-1 capable of measuring outdoor temperature and outdoor humidity and the air conditioner ouputter 350-1 including an outdoor heat exchanging portion.

The outdoor heat exchanging portion of the air conditioner outputter 350-1 included in the outdoor unit (not shown) may include a compressor (not shown) for compressing refrigerators, an expander (not shown) for decompressing refrigerators, and an outdoor heat exchanger (not shown) for performing heat exchange between refrigerators and outdoor air.

As such, the heat exchanging portion including the indoor heat exchanging portion and the outdoor heat exchanging portion may adjust indoor temperature by absorbing ambient heat when refrigerators evaporate and emitting heat when refrigerators are condensed.

When the air conditioner controller 340-1 according to an embodiment of the disclosure receives an operation command for at least one of an operation mode or operation temperature from a user through the air conditioner inputter 310-1, the air conditioner controller 340-1 may control the heat exchanging portion of the air conditioner outputter 350-1 to operate based on the operation command.

The operation mode may correspond to at least one of a wind-free (light air flow) mode, a cooling (stronger than light air flow i.e. medium air flow or strong air flow) mode, a heating mode, or an air purifying mode according to an operation of the heat exchanging portion, and the operation temperature may correspond to target temperature according to an operation of the air conditioner 300-1.

Also, when the air conditioner controller 340-1 according to an embodiment of the disclosure receives neural network output information including an operation command for at least one of an operation mode or operation temperature from the second server 200, the air conditioner controller 340-1 may control the heat exchanging portion of the air conditioner outputter 350-1 to operate based on the operation command of the neural network output information. The operation command included in the neural network output information may be a result of performing an operation on occupant information or on the occupant information and sensing information through the neural network, and may be an operation command with high frequency among operation commands (e.g., setting temperature and a setting mode) set by a user with regard to occupants and the number of the occupants corresponding to the occupant information.

That is, the air conditioner 300-1 may automatically change at least one of operation temperature or an operation mode based on a change of occupants and the number of the occupants.

In other words, the air conditioner controller 340-1 may receive information about a terminal connected to the access point 20 through the air conditioner communicator 330-1, and, when a new terminal is connected to the access point 20 or a terminal connected to the access point 20 is disconnected from the access point 20, the air conditioner controller 340-1 may change at least one of operation temperature or an operation mode.

More specifically, when a new terminal is connected to the access point 20 or a terminal connected to the access point 20 is disconnected from the access point 20 so that the terminal connected to the access point 20 changes, the air conditioner controller 340-1 may control the communicator 330 to receive an output of the neural network for changed information about a terminal connected to the access point 20 from the second server 200.

When the information about the terminal connected to the access point 20 changes according to a change of the number of occupants and the changed information is received through the air conditioner communicator 330-1, the air conditioner controller 340-1 may request the second server 200 to transmit an output of the neural network for the changed information.

Also, the air conditioner controller 340-1 may control the air conditioner communicator 330-1 to receive an output of the neural network further considering sensing information in addition to the changed information about the terminal connected to the access point 20 from the second server 200.

That is, when the information about the terminal connected to the access point 20 changes according to a change of the number of occupants and the changed information is received through the air conditioner communicator 330-1, the air conditioner controller 340-1 may request the second server 200 to transmit an output of the neural network for the changed information and sensing information acquired by the air conditioner sensor 320-1.

The sensing information may include at least one of indoor temperature, indoor humidity, outdoor temperature, or outdoor humidity, and the neural network output information, that is, the output of the neural network may include an operation command for at least one of operation temperature or an operation mode.

Referring to FIG. 4C, a television 300-2 according to an embodiment of the disclosure may include a television inputter 310-2 for receiving an operation command for the television 300-2, a television sensor 320-2 including a heat sensor for sensing a user located in a vicinity of the television 300-2, a television communicator 330-2 for communicating with the access point 20 to be connected to the wide area network 30 and receiving terrestrial broadcasting signals, cable broadcasting signals, and satellite broadcasting signals, a television controller 340-2 for determining broadcasting signals to be received based on an operation command and controlling a television outputter 350-2 to output broadcast based on received broadcasting signals, the television outputter 350-2 including a display and speaker for outputting broadcast according to an operation command, and a television storage device 360-2 storing programs and data related to operations of the television 300-2.

The display of the television outputter 350-2 may reproduce an image corresponding to a broadcasting signal selected based on an operation command. To reproduce images, the display may include a panel, and the panel may be any one of a cathode ray tube (CRT) panel, a liquid crystal display (LCD) panel, a light emitting diode (LED) panel, an organic light emitting diode (OLED) panel, a plasma display panel (PDP), and a field emission display (FED) panel.

Also, the speaker of the television outputter 350-2 may reproduce sound corresponding to a broadcasting signal selected based on an operation command.

When the television controller 340-2 according to an embodiment of the disclosure receives an operation command for selecting a broadcast channel from a user through the television inputter 310-2, the television controller 340-2 may control the display and the speaker of the television outputter 350-2 to operate based on the operation command.

Also, when the television controller 340-2 according to an embodiment of the disclosure receives neural network output information including an operation command for selecting a broadcast channel from the second server, the television controller 340-2 may control the display and the speaker of the television outputter 350-2 to operate based on the operation command of the neural network output information.

Herein, the operation command included in the neural network output information may be a result of performing an operation on occupant information through the neural network, and may be an operation command with high frequency among operation commands (e.g., a command of selecting a broadcasting channel) set by a user with regard to occupants and the number of the occupants corresponding to the occupant information.

Referring to FIG. 4D, a refrigerator 300-3 according to an embodiment of the disclosure may include a refrigerator inputter 310-3 for receiving an operation command for the refrigerator 300-3, a refrigerator sensor 320-3 for detecting temperature of a storage room (not shown) storing food, a refrigerator communicator 330-3 for communicating with the access point 20 to be connected to the wide area network 30, a refrigerator controller 340-3 for controlling overall operations of the refrigerator 300-3, a refrigerator outputter 350-3 including a refrigerator cooler (not shown) for cooling the storage room (not shown) storing food, and a refrigerator storage device 360-3 storing programs and data related to operations of the refrigerator 300-3.

The refrigerator cooler (not shown) of the refrigerator outputter 350-3 may include a flowpath (not shown) through which refrigerants circulate, a compressor (not shown) for compressing refrigerants, a condenser (not shown) for condensing refrigerants, an expander (not shown) for decompressing condensed refrigerants, and an evaporator (not shown) for evaporating decompressed refrigerants. The refrigerator cooler (not shown) may cool the storage room (not shown) through refrigerants absorbing ambient heat when evaporating in the evaporator (not shown). Also, the refrigerator cooler (not shown) may generate ice through the refrigerants that absorb ambient heat when evaporating in the evaporator (not shown), according to an operation command.

Also, the refrigerator outputter 350-3 may include a display and a speaker provided in a main body of the refrigerator 300-3, and output food recipes or multimedia data such as movies or music, according to an operation command.

The refrigerator outputter 350-3 may set temperature of the storage room (not shown) provided in the refrigerator 300-3 based on an operation command, execute an ice-making function for making ice pieces, or output multimedia data, based on an operation command.

More specifically, when the refrigerator controller 340-3 according to an embodiment of the disclosure receives an operation command from a user through the refrigerator inputter 310-3, the refrigerator controller 34-3 may control at least one of the refrigerator cooler (not shown), the display, or the speaker of the refrigerator outputter 350-3 to operate based on the operation command.

Also, when the refrigerator controller 340-3 according to an embodiment of the disclosure receives neural network output information including an operation command from the second server 200, the refrigerator controller 340-3 may control at least one of the refrigerator cooler (not shown), the display, or the speaker of the refrigerator outputter 350-3 to operate based on the operation command of the received neural network output information.

Herein, the operation command included in the neural network output information may be a result of performing an operation on occupant information through the neural network, and may be an operation command with high frequency among operation commands (e.g., temperature of the storage room, execution of the ice-making function, an output of multimedia data, etc.) set by a user with regard to occupants and the number of the occupants corresponding to the occupant information.

That is, the refrigerator 300-3 may automatically change at least one of temperature of the storage room, execution of the ice-making function, or an output of multimedia data based on changes of the occupants and the number of the occupants.

In other words, the refrigerator controller 340-3 may receive information about a terminal connected to the access point 20 through the refrigerator communicator 330-3, and change at least one of temperature of the storage room, execution of the ice-making function, or an output of multimedia data when a new terminal is connected to the access point 20 or a terminal connected to the access point 20 is disconnected from the access point 20.

Referring to FIG. 4E, a cooker 300-4 according to an embodiment of the disclosure may include a cooker inputter 310-4 for receiving an operation command for the cooker 300-4, a cooker sensor 320-4 for detecting temperature of a cooking room (not shown), a cooker communicator 330-4 for communicating with the access point 20 to be connected to the wide area network 30, a cooker controller 340-4 for controlling overall operations of the cooker 300-4, a cooker outputter 350-4 including a cooker heater (not shown) for heating a cooking target placed in the cooking room (not shown), and a cooker storage device 360-4 storing programs and data related to operations of the cooker 300-4.

The cooker heater (not shown) of the cooker outputter 350-4 may include a high-frequency heater (not shown) for radiating a high frequency to the cooking room (not shown), a convection heater (not shown) for supplying hot air to the cooking room (not shown), and a grill heater (not shown) for supplying radiant heat to the cooking room (not shown).

The cooker outputter 350-4 may control at least one of the high-frequency heater, the convection heater, or the grill heater based on an operation command to heat a cooking target placed in the cooking room (not shown). That is, the cooker outputter 350-4 may select a cooking mode for forming a pre-set combination of heat sources according to an operation command and control the heat sources corresponding to the selected cooking mode to heat a cooking target to various textures.

More specifically, when the cooker controller 340-4 according to an embodiment of the disclosure receives an operation command (e.g., a cooking mode, a cooking time, cooking temperature, etc.) from a user through the cooker inputter 310-4, the cooker controller 340-4 may control the cooker heater (not shown) of the cooker outputter 350-4 to operate based on the operation command.

Also, when the cooker controller 340-4 according to an embodiment of the disclosure receives neural network output information including an operation command from the second server 200, the cooker controller 340-4 may control the cooker heater (not shown) of the cooker outputter 350-4 to operate based on an operation command included in the received neural network output information.

Herein, the operation command included in the neural network output information may be a result of performing an operation on occupant information through the neural network, and may be an operation command with high frequency among operation commands (e.g., a cooking mode, a cooking time, cooking temperature, etc.) set by a user with regard to occupants and the number of the occupants corresponding to the occupant information.

Referring to FIG. 4F, a washing machine 300-5 according to an embodiment of the disclosure may include a washing machine inputter 310-5 for receiving an operation command for the washing machine 300-5, a washing machine sensor 320-5 for detecting a washing target in a drum (not shown) and temperature of water stored in the drum (not shown), a washing machine communicator 330-5 for communicating with the access point 20 to be connected to the wide area network 30, a washing machine controller 340-5 for controlling overall operations of the washing machine 300-5, a washing machine outputter 350-5 including a washing machine driving motor (not shown) for rotating the drum (not shown), and a washing machine storage device 360-5 storing programs and data related to operations of the washing machine 300-5.

The washing machine 300-5 may accommodate a washing target in the drum (not shown) and rotate the drum (not shown) by using the washing machine driving motor (not shown) of the washing machine outputter 350-5 to wash the washing target. That is, the washing machine outputter 350-5 may control the washing machine driving motor to wash a washing target stored in the drum (not shown) in a washing mode (rinsing, spinning, standard washing, etc.) corresponding to an operation command.

More specifically, when the washing machine controller 340-5 according to an embodiment of the disclosure receives an operation command (e.g., a washing mode, a washing time, temperature of water, etc.) from a user through the washing machine inputter 310-5, the washing machine controller 340-5 may control the washing machine driving motor (not shown) of the washing machine outputter 350-5 to operate based on the operation command.

Also, when the washing machine controller 340-5 according to an embodiment of the disclosure receives neural network output information including an operation command from the second server 200, the washing machine controller 340-5 may control the washing machine driving motor (not shown) of the washing machine outputter 350-5 to operate based on the operation command included in the neural network output information.

Here, the operation command included in the neural network output information may be a result of performing an operation on occupant information through the neural network, and may be an operation command with high frequency among operation commands (e.g., a washing mode, a washing time, temperature of water, etc.) set by a user with regard to occupants and the number of the occupants corresponding to the occupant information.

So far, the control block diagrams according to the kinds of home appliances that may be used as the home appliance 300 according to an embodiment of the disclosure have been described. However, the home appliance 300 according to an embodiment of the disclosure is not limited to the above-described examples, and according to some embodiments, the home appliance 300 may be a clothes care apparatus placed in home H to dry clothes in the chamber or remove dust from clothes, a robot cleaner placed in home H to perform cleaning, or a speaker placed in home H to output sound.

Hereinafter, operations of the home network system 1 will be described in detail.

FIG. 5 shows a signal flow when the home network system 1 according to an embodiment of the disclosure manages occupant information.

Referring to FIG. 5, the terminal 10 according to an embodiment of the disclosure may receive an input for usage activation of occupant information from a user through an inputter (not shown) provided in a main body of the terminal 10 to receive an input from the user, in operation 510.

The terminal 10 may be an electronic device of a user who makes an input for usage activation of occupant information, wherein the user may be one of members that reside in home H where the home appliance 300 is placed.

The terminal 10 according to an embodiment of the disclosure may transmit a message for usage activation of occupant information based on the input for usage activation of occupant information to the second server 200, in operation 520.

The message for usage activation of occupant information may be transmitted to the second server 200 via the access point 20, the wide area network 30, and the IOT interface 120 of the first server 100.

When the second server 200 receives the message for usage activation of occupant information, the second server 200 may transmit a message requesting a subscription of the occupant information to the first server 100, in operation 530.

That is, when the second server 200 receives a request from a user through the terminal 10, the second server 200 may request an external server to transmit occupant information, and collect the occupant information and learn a pre-stored neural network or acquire neural network output information through a learned neural network.

However, unlike FIG. 5, the home appliance 300 may receive an input for usage activation of occupant information, and transmit a message for usage activation of the occupant information to the second server 200.

Also, according to some embodiments, operations of receiving an input for usage activation of occupant information and transmitting a message for usage activation of the occupant information may be omitted. In this case, according to some embodiments, the second server 200 may request the external server to transmit occupant information, although no request from a user is received.

The terminal 10 according to an embodiment of the disclosure may be connected to the access point 20 in the home H, in operation 540.

More specifically, when the terminal 10 enters the home H together with the user, the terminal 10 may transmit a connection request message to the access point 20 and be assigned an access right to be connected to the access point 20.

Accordingly, the terminal 10 may access the wide area network 30 through the access point 20, and finally communicate with the first server 100.

When the terminal 10 according to an embodiment of the disclosure is connected to the access point 20 located in the home H, the terminal 10 may transmit a user account and occupancy information to the first server 100, in operation 550.

That is, when the terminal 10 is connected to the access point 20 in the home H, the terminal 10 may transmit account information of the user and occupancy information representing that the user has entered the home H, stored in a memory of the terminal 10, to the first server 100 through the access point 20.

In other words, when the terminal 10 is connected to the access point 20, the terminal 10 may determine that the user has entered the home H to be in the home H, and transmit occupancy information representing that the user has entered the home H to be in the home H to the first server 100 through the access point 20.

However, unlike FIG. 5, when the terminal 10 is disconnected from the access point 20 located in the home H, the terminal 10 may transmit occupancy information representing that the user has leaved the home H, together with the account information of the user, to the first server 10.

The account information of the user may correspond to an identifier (ID) designated in advance by the user, and the occupancy information may correspond to information (e.g., home in and home out) representing whether or not the user is in the home H.

When the first server 100 according to an embodiment of the disclosure receives the account information of the user and the occupancy information from the terminal 10, the first server 100 may refine occupant information based on the account information of the user and the occupancy information, in operation 560.

More specifically, when the first server 100 receives the account information of the user and the occupancy information from the terminal 10, the first server 100 may identify occupants being in the home H and determine the number of the occupants to generate occupant information representing the occupants and the number of the occupants based on the account information of the user and the occupancy information.

That is, the occupant information may include information about the number of occupants being in the home H and information about who the occupants are, that is, identification information of the occupants.

As such, the first server 100 may recognize changes of occupants and the number of the occupants in real time based on account information of a user and occupancy information received from the terminal 10 whenever the terminal 10 of each member is connected/disconnected to/from the access point 20, and refine the occupant information in real time.

In other words, the occupant information may correspond to information about a terminal connected to the access point 20. More specifically, the occupant information may include identification information of a terminal connected to the access point 20 and account information of a user using the terminal, and represent occupants currently being in the home H and the number of the occupants.

The first server 100 according to an embodiment of the disclosure may transmit the occupant information to the second server 200, in operation 570.

That is, the first server 100 may transmit the generated or refined occupant information to the second server 200 that has requested a subscription of the occupant information. However, the first server 100 may transmit the occupant information to the second server 200 connected through the wide area network 30, although there is no request for a subscription of the occupant information.

When the second server 200 according to an embodiment of the disclosure receives the occupant information representing the occupants and the number of the occupants from the first server 100, the second server 200 may transmit the received occupant information to the home appliance 300 through the first server 100, in operation 580, and, when the home appliance 300 according to an embodiment of the disclosure receives the occupant information from the second server 200, the home appliance 300 may store the received occupant information, in operation 590.

However, according to some embodiments, the home appliance 300 may receive information about a terminal connected to the access point 20 from the access point 20 through the communicator 330, and identify occupants and determine the number of the occupants.

As such, the home appliance 300 may receive the occupant information from the first server 100 or the access point 20.

Accordingly, the home appliance 300 may identify occupants and determine the number of the occupants based on the occupant information, and acquire information about an appliance state corresponding to the occupant information, which will be described later. Also, the home appliance 300 may transmit the information about the appliance state corresponding to the occupant information to the second server 200 to enable the second server 200 to refine a neural network. Hereinafter, a case in which the second server 200 refines a neural network will be described in detail.

Figure 7:
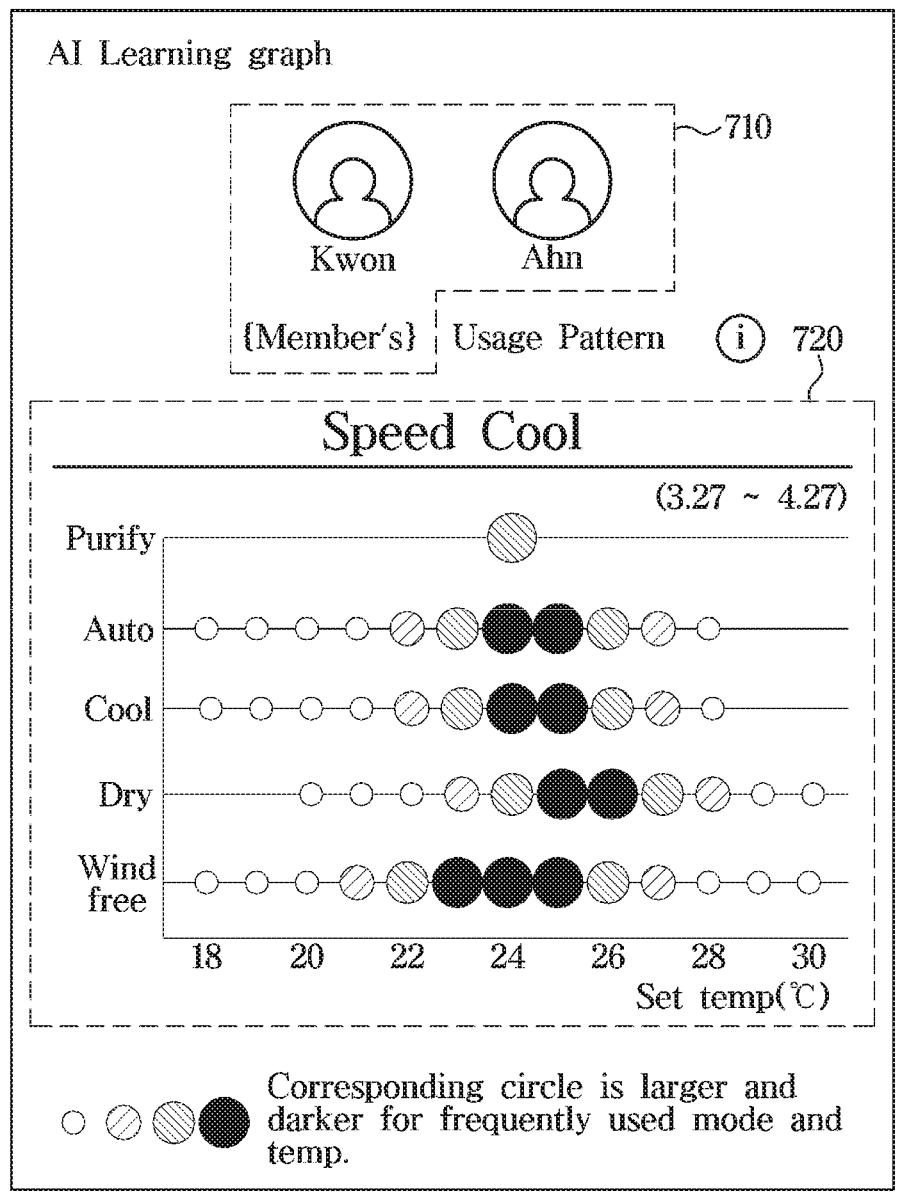
FIG. 7 shows an example of data learning that is performed in a second server according to an embodiment of the disclosure.

FIG. 6 shows a signal flow when the home network system 1 according to an embodiment of the disclosure refines a neural network, and FIG. 7 shows an example of data learning that is performed in the second server 200 according to an embodiment of the disclosure.

Referring to FIG. 6, the home appliance 300 according to an embodiment of the disclosure may receive an input for an operation command from a user through the inputter 310, in operation 610, and control the outputter 350 based on user setting information corresponding to the input, in operation 620.

As such, the home appliance 300 may control the outputter 350 based on an operation command input from at least one of occupants.

The home appliance 300 according to an embodiment of the disclosure may transmit information about an appliance state to the second server 200 through the first server 100, in operation 630.

The information about the appliance state may include at least one of user setting information representing an operation command input from at least one of occupants through the inputter 310 of the home appliance 300 or sensing information about a surrounding environment acquired by the sensor 320 of the home appliance 300.

The second server 200 according to an embodiment of the disclosure may refine a neural network based on the information about the appliance state and occupant information, in operation 640.

That is, by acquiring user setting information and sensing information corresponding to occupant information in a normal mode in which the home appliance 300 operates according to an operation command input from a user, the second server 200 may refine a neural network that outputs an operation command for the home appliance 300 by performing an operation on the occupant information in an AI mode.

Even in a situation in which the home appliance 300 controls the outputter 350 based on the neural network output information, when receiving the input for the operation command from the user, the home appliance 300 may control the outputter 350 based on user setting information corresponding to the input and may transmit information about the appliance state to the second server. Through this, the second server 200 may update the neural network such that the neural network output information approaches the operation command input from the user.

More specifically, the second server 200 may refine the neural network based on an input operation command and information about a terminal connected to the access point 20 corresponding to occupant information, and refine the neural network by further considering sensing information acquired when the operation command is input.

In other words, when an occupant represented by the occupant information is in the home H, the second server 200 may receive setting information of the home appliance 300 input by the occupant and sensing information about a surrounding environment acquired by the home appliance 300 to secure data for learning the neural network.

More specifically, the second server 200 may refine the neural network based on the information about the appliance state and the occupant information.

The neural network may be machine learning that images a neural structure capable of performing deep learning, wherein weights and biases corresponding to configurations of the neural network continue to change to improve the reliability of learning.

That is, the second server 200 may continue to refine weights and biases corresponding to configurations of the neural network based on the information about the appliance state and the occupant information received from the home appliance 300.

In other words, the second server 200 may continue to refine weights, biases, and activation functions included in the neural network based on occupant information and user setting information corresponding to the occupant information to improve an inference result of the neural network. However, the second server 200 may refine the neural network based on occupant information, sensing information, and user setting information corresponding to the occupant information and the sensing information.

For example, as shown in FIG. 7, when the home appliance 300 is the air conditioner 300-1, the data learner 213 of the second server 200 may refine the neural network based on occupant information 710 representing occupants (e.g., Kwon and Ahn) and the number of the occupants and user setting information (e.g., an operation mode and operation temperature) corresponding to the occupant information 710.

In this case, when a user represented by the occupant information 710 is in home H, the second server 200 may receive and store user setting information (e.g., an operation mode and operation temperature) input by the user represented by the occupant information 710 whenever the home appliance 300 operates or at regular time intervals to acquire information 720 about frequency of operation temperature for each operation mode, and refine the neural network based on the occupant information 710 and the information 720 about frequency of operation temperature for each operation mode corresponding to the occupant information 710.

Also, the second server 200 may refine the neural network by further considering sensing information (e.g., at least one of indoor temperature, indoor humidity, outdoor temperature, or outdoor humidity) in addition to the above-described information.

Also, the second server 200 may provide a neural network for each kind of home appliances, as well as the air conditioner 300-1, and refine the neural network based on information for each kind of home appliances.

For example, the second server 200 may refine a neural network corresponding to the television 300-2 based on occupant information and user setting information (e.g., selection of a broadcasting channel, etc.) related to the television 300-2 and corresponding to the occupant information, and also refine a neural network corresponding to the refrigerator 300-3 based on occupant information and user setting information (e.g., temperature of a storage room, execution of an ice-making function, an output of multimedia data, etc.) related to the refrigerator 300-3 and corresponding to the occupant information.

Also, the second server 200 may refine a neural network corresponding to the cooker 300-4 based on occupant information and user setting information (e.g., a cooking mode, a cooking time, cooking temperature, etc.) related to the cooker 300-4 and corresponding to the occupant information, and refine a neural network corresponding to the washing machine 300-5 based on occupant information and user setting information (e.g., a washing mode, a washing time, temperature of water, etc.) related to the washing machine 300-5 and corresponding to the occupant information.

However, user setting information for each kind of home appliance is not limited to the above-mentioned examples, and may be any information capable of being set by a user according to a kind of home appliance.

As such, the second server 200 may refine the neural network based on occupant information and information about an appliance state corresponding to the occupant information, store a neural network for each kind of home appliances, and refine a neural network corresponding to each home appliance based on information about an appliance state for each kind of home appliances.

Therefore, the neural network may output neural network output information including an operation command for the home appliance 300 based on occupant information in the AI mode in which no input for an operation command is received from a user. Also, according to some embodiments, the neural network may output neural network output information further considering sensing information as well as occupant information. Hereinafter, a case in which the home network system 1 uses a neural network will be described in detail.

Figure 8:
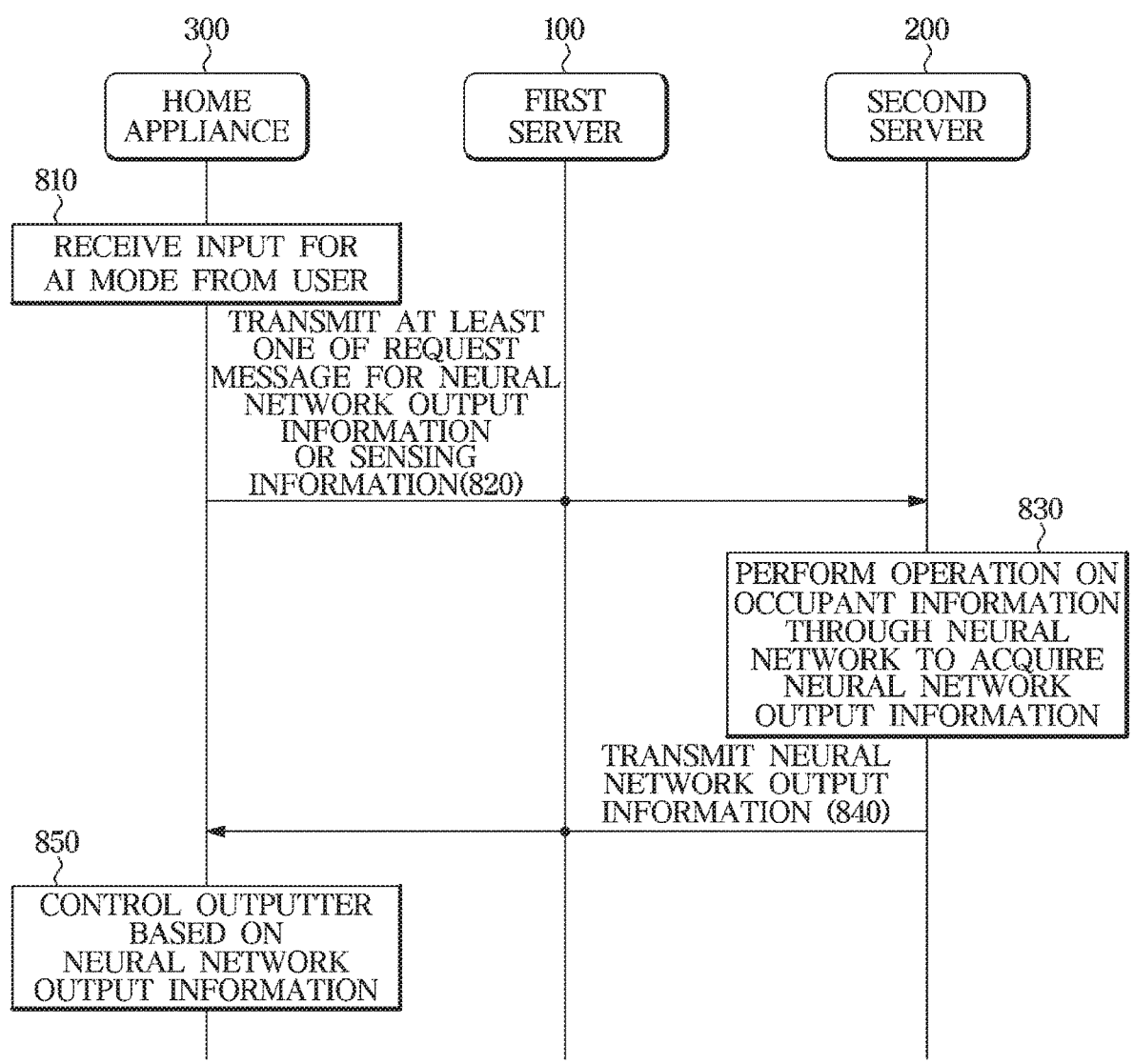
FIG. 8 shows a signal flow when a home network system according to an embodiment of the disclosure uses a neural network.

FIG. 8 shows a signal flow when the home network system 1 according to an embodiment of the disclosure uses a neural network, and FIG. 9 shows an example of a control in an AI mode of the air conditioner 300-1 according to an embodiment of the disclosure.

Referring to FIG. 8, the home appliance 300 according to an embodiment of the disclosure may receive an input for an AI mode from a user through the inputter 310, in operation 810.

Herein, the AI mode may correspond to a mode in which the home appliance 300 operates according to an operation command received from an external server based on occupant information, although receiving any user input for an operation command. In other words, in the AI mode, the home appliance 300 may operate according to information about a terminal connected to the access point 20.

The home appliance 300 according to an embodiment of the disclosure may transmit at least one of a request message for neural network output information or sensing information to the second server 200 through the first server 100, in operation 820.

When the second server 200 according to an embodiment of the disclosure receives the request message for the neural network output information from the home appliance 300, the second server 200 may perform an operation on current occupant information through a neural network to acquire neural network output information, in operation 830.

Herein, the neural network output information may correspond to information acquired when a neural network learned based on occupant information and information about an appliance state performs an operation on occupant information, and the neural network output information may include an operation command for the home appliance 300, the operation command being optimized for the occupant information.

That is, the operation command included in the neural network output information may be an operation command with high frequency among operation commands set by a user with regard to occupants and the number of the occupants corresponding to the occupant information.

Also, the second server 200 according to an embodiment of the disclosure may acquire neural network output information by further considering sensing information received together with a request for an output of the neural network from the home appliance 300, in addition to the occupant information.

That is, the home appliance 300 may operate based on an output of the neural network for the information about the terminal connected to the access point 20, or based on an output of the neural network for the information about the terminal connected to the access point 20 and sensing information.

For example, when the home appliance 300 is the air conditioner 300-1, as shown in FIG. 9, the second server 200 may perform an operation on occupant information (e.g., occupants and the number of the occupants) and sensing information (e.g., indoor temperature and relative humidity) through the neural network to acquire neural network output information including an operation command (e.g., operation temperature and an operation mode) corresponding to the occupant information and the sensing information.

However, the above example is an embodiment, and the air conditioner 300-1 may operate based on an output of the neural network for occupant information, that is, the information about the terminal connected to the access point 20.

Also, the second server 200 may provide a neural network for each kind of home appliances, as well as the air conditioner 300-1, and acquire neural network output information corresponding to each kind of home appliance based on occupant information.

More specifically, when the home appliance 300 is the television 300-2, the second server 200 may perform an operation on occupant information through the neural network to acquire neural network output information including an operation command (e.g., selection of a broadcasting channel) corresponding to the occupant information, and, when the home appliance 300 is the refrigerator 300-3, the second server 200 may perform an operation on occupant information through the neural network to acquire neural network output information including an operation command (e.g., temperature of a storage room, execution of an ice-making function, an output of multimedia data, etc.) corresponding to the occupant information.

Also, when the home appliance 300 is the cooker 300-4, the second server 200 may perform an operation on occupant information through the neural network to acquire neural network output information including an operation command (e.g., a cooking mode, a cooking time, cooking temperature, etc.) corresponding to the occupant information, and, when the home appliance 300 is the washing machine 300-5, the second server 200 may perform an operation on occupant information through the neural network to acquire neural network output information including an operation command (e.g., a washing mode, a washing time, temperature of water, etc.) corresponding to the occupant information.

The second server 200 according to an embodiment of the disclosure may transmit the acquired neural network output information to the corresponding home appliance 300 through the first server 100, in operation 840. Accordingly, the home appliance 300 may control the outputter 350 based on the neural network output information optimized for occupants and the number of the occupants, although receiving any operation command from an occupant, in operation 850.

In this case, when the occupant information is refined according to a change of the occupants, the second server 200 may again perform an operation on the refined occupant information through the neural network to refine the neural network output information, and control the communicator 220 to transmit the refined neural network output information to the home appliance 300.

That is, the second server 200 may reflect a change of the occupants according to entry or exit of an occupant to/from home H in real time so that the home appliance 300 operates according to an operation command optimized for occupants currently being in the home H and the number of the occupants.

At this time, the controller 340 of the home appliance 300 may receive information about a terminal connected to the access point 20 through the communicator 330, and, when a new terminal is connected to the access point 20 or a terminal connected to the access point 20 is disconnected from the access point 20, the controller 340 may change an operation of the outputter 350.

More specifically, when a new terminal is connected to the access point 20 or a terminal connected to the access point 20 is disconnected from the access point 20 so that the terminal connected to the access point 20 changes, the controller 340 may control the communicator 330 to receive an output of the neural network for information about a terminal connected to the access point 20 from the second server 200. Also, the controller 340 may control the communicator 330 to receive an output of the neural network further considering sensing information in addition to changed information about a terminal connected to the access point 20 from the second server 200.

In this case, the neural network output information, that is, the output of the neural network may include an operation command for an operation (for example, an operation mode, operation temperature, etc.) of the outputter 350.

Hereinafter, a method of controlling the home appliance 300 and a method of controlling the second server 200, according to an embodiment of the disclosure, will be described. The method of controlling the home appliance 300 and the method of controlling the second server 200, which will be described below, may be applied to the home appliance 300 and the second server 200 according to the above-described embodiments of the disclosure. Accordingly, the above descriptions given with reference to FIGS. 1 to 9 may be applied in the same way to the method of controlling the home appliance 300 and the method of controlling the second server 200, unless otherwise specifically stated.

Figure 10:
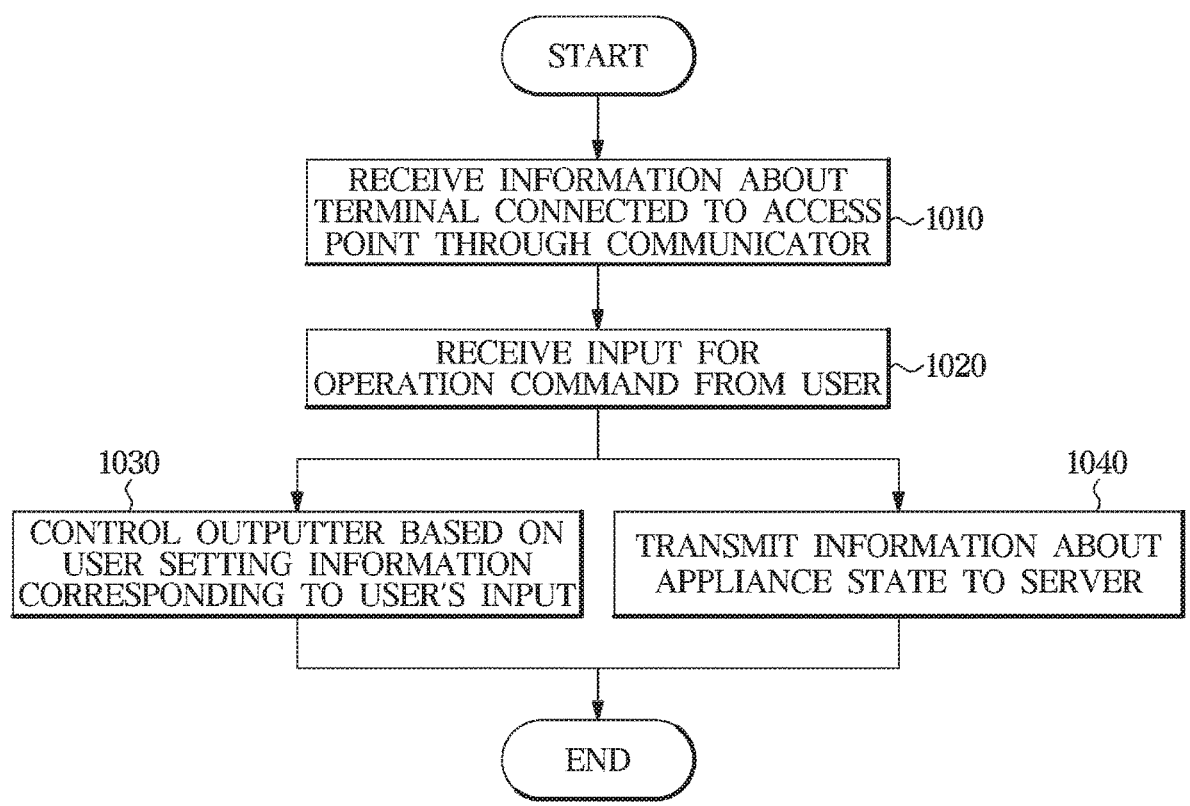
FIG. 10 is a flowchart related to a case of controlling an outputter according to a user's input, in a method of controlling a home appliance according to an embodiment of the disclosure.

FIG. 10 is a flowchart related to a case of controlling the outputter 350 according to a user's input, in a method of controlling the home appliance 300 according to an embodiment of the disclosure.

Referring to FIG. 10, the home appliance 300 according to an embodiment of the disclosure may receive information about a terminal connected to the access point 20 through the communicator 330, in operation 1010.

Herein, the information about the terminal connected to the access point 20 may correspond to occupant information representing occupants being in home H and the number of the occupants.

The home appliance 300 according to an embodiment of the disclosure may receive an input for an operation command from a user, in operation 1020.

That is, the home appliance 300 may receive an input for an operation command for the home appliance 300 from at least one of the occupants through the inputter 310.

The home appliance 300 according to an embodiment of the disclosure may control the outputter 350 based on user setting information corresponding to a user's input, in operation 1030, and transmit information about an appliance state to a server, in operation 1040.

Herein, the information about the appliance state may correspond to the information about the terminal connected to the access point 20, and may include at least one of user setting information representing an operation command input from at least one of the occupants through the inputter 310 of the home appliance 300 or sensing information about a surrounding environment acquired by the sensor 320 of the home appliance 300.

As such, the home appliance 300 may transmit at least one of user setting information including an operation command input from the user or sensing information about a surrounding environment acquired by the sensor 320 to the server, in the normal mode in which the home appliance 300 operates based on an operation command input from the user, thereby providing the server with data that is learned by a neural network of the server. The server may refine the neural network based on the information about the terminal connected to the access point 20 and the information about the appliance state.

Even in a situation in which the home appliance 300 controls the outputter 350 based on the neural network output information, when receiving the input for the operation command from the user, the home appliance 300 may control the outputter 350 based on user setting information corresponding to the input and may transmit information about the appliance state to the second server. Through this, the second server 200 may update the neural network such that the neural network output information approaches the operation command input from the user.

Figure 11:
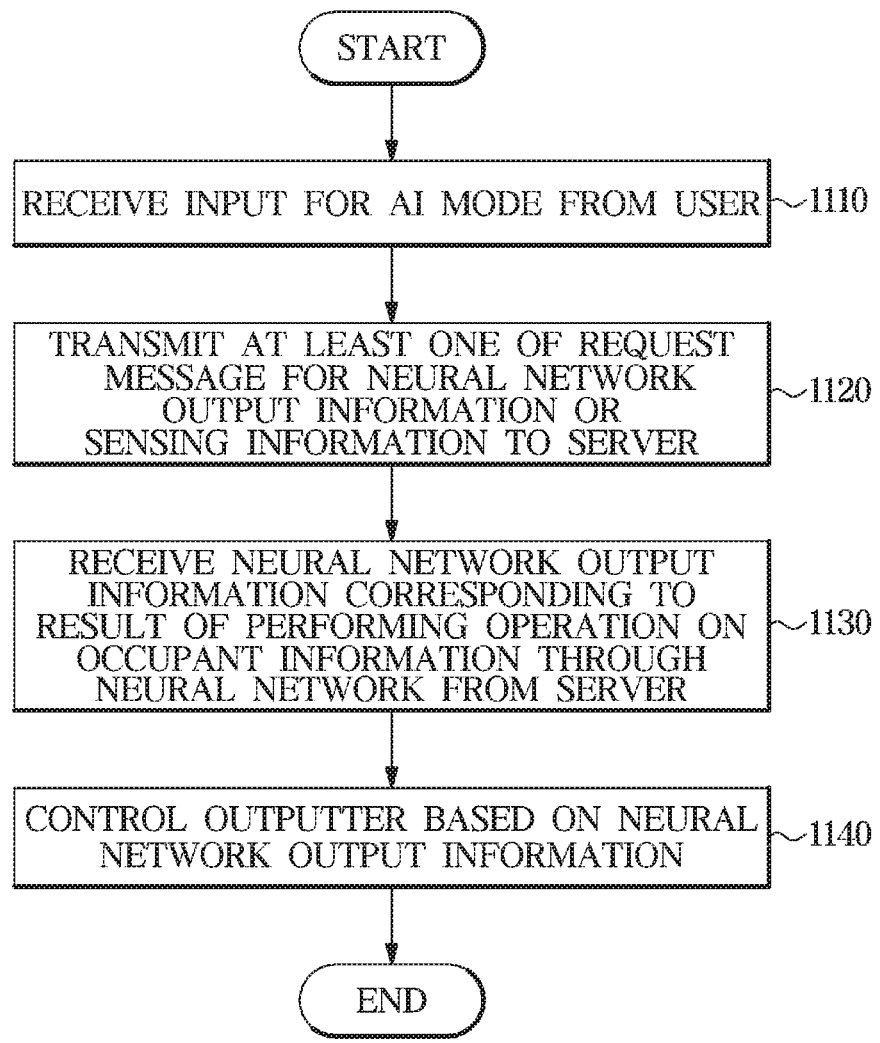
FIG. 11 is a flowchart related to a case of controlling an outputter according to an AI mode, in a method of controlling a home appliance according to an embodiment of the disclosure.

FIG. 11 is a flowchart related to a case of controlling the outputter 350 according to the AI mode, in the method of controlling the home appliance 300 according to an embodiment of the disclosure.

Referring to FIG. 11, the home appliance 300 according to an embodiment of the disclosure may receive an input for the AI mode from a user through the inputter 310, in operation 1110.

Herein, the AI mode may correspond to a mode in which the home appliance 300 operates according to an operation command received from an external server based on occupant information without receiving any user input for an operation command.

The home appliance 300 according to an embodiment of the disclosure may transmit at least one of a request message for neural network output information or sensing information to the server, in operation 1120.

That is, the home appliance 300 may request the server to transmit a result of performing an operation on occupant information through a neural network. At this time, the home appliance 300 may further transmit sensing information to the server to enable the server to further consider the sensing information when performing the operation through the neural network.

The home appliance 300 according to an embodiment of the disclosure may receive neural network output information corresponding to the result of performing the operation on the occupant information through the neural network from the server, in operation 1130.

Herein, the neural network output information may correspond to information acquired when a neural network learned based on occupant information and information about an appliance state performs an operation on the occupant information, and the neural network output information may include an operation command for the home appliance 300, the operation command being optimized for the occupant information.

That is, the operation command included in the neural network output information may be an operation command with high frequency among operation commands set by a user with regard to occupants and the number of the occupants corresponding to the occupant information.

According to an embodiment, the home appliance 300 may receive neural network output information acquired by further considering sensing information in addition to the occupant information, from the server. That is, the home appliance 300 may receive neural network output information corresponding to a result of performing an operation on the occupant information and the sensing information through the neural network, from the server.

The home appliance 300 according to an embodiment of the disclosure may control the outputter 300 based on the neural network output information, in operation 1140.

When the occupant information is refined according to a change of the occupants, the home appliance 300 may receive refined neural network output information corresponding to a result of performing an operation on the refined occupant information through the neural network from the server, and control the outputter 350 based on the refined neural network output information.

That is, in the AI mode, the home appliance 300 may receive neural network output information obtained by reflecting a change of the occupants according to entry or exit of an occupant to/from home H in real time, and operate according to an operation command optimized for occupants currently being in the home H and the number of the occupants.

Figure 12:
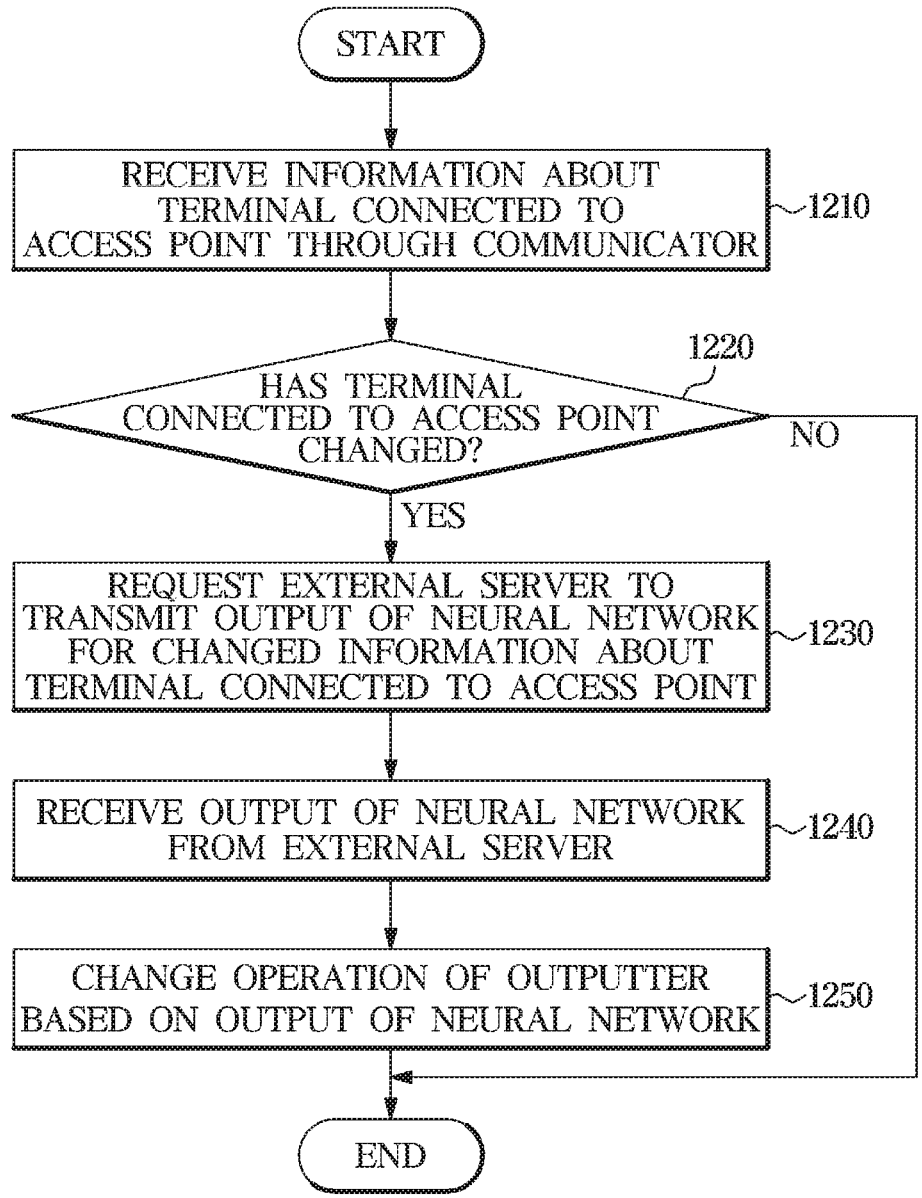
FIG. 12 is a flowchart related to a case in which an operation of a home appliance changes according to a change of occupants, in a method of controlling a home appliance according to an embodiment of the disclosure.

FIG. 12 is a flowchart related to a case in which an operation of the home appliance 300 changes according to a change of occupants, in the method of controlling the home appliance 300 according to an embodiment of the disclosure.

Referring to FIG. 12, the home appliance 300 according to an embodiment of the disclosure may receive information about a terminal connected to the access point 20 through the communicator 330, in operation 1210.

The home appliance 300 may receive the information about the terminal connected to the access point 20 directly from the access point 20 or from the first server 100.

In this case, the first server 100 may identify each terminal connected to the access point 20 based on information received from the terminal, and transmit the information about the terminal connected to the access point 20 to the home appliance 300 based on the identified information.

When the terminal connected to the access point 20 changes ("YES" in operation 1220), the home appliance 300 according to an embodiment of the disclosure may request an external server to transmit an output of a neural network for changed information about a terminal connected to the access point 20, in operation 1230.

More specifically, when a new terminal is connected to the access point 20 or a terminal connected to the access point 20 is disconnected from the access point 20 so that the terminal connected to the access point 20 changes, the home appliance 300 may receive information about a terminal connected to the access point 20 through the communicator 330, and control the communicator 330 to transmit a message requesting an output of the neural network for the changed information to the second server 200.

Also, according to some embodiments, the home appliance 300 may control the communicator 330 to transmit sensing information acquired by the sensor 320 to the second server 200, and control the communicator 330 to transmit a message requesting an output of the neural network for the changed information about the terminal connected to the access point 20 and the sensing information to the second server 200.

The home appliance 300 according to an embodiment of the disclosure may receive an output of the neural network from the external server, in operation 1240.

That is, the home appliance 300 may receive an output of the neural network for the changed information about the terminal connected to the access point 20 from the first server 100, and receive an output of the neural network further considering the sensing information in addition to the changed information.

According to some embodiments, the home appliance 300 may receive an output of the neural network for the changed information about the terminal connected to the access point 20 from the external server, although the home appliance 300 does not request the external server to transmit an output of the neural network. That is, the external server may determine a change of the information about the terminal connected to the access point 20 based on information received from the terminal 10 or the access point 20, and automatically transmit an output of the neural network for the changed information about the terminal connected to the access point 20 to the home appliance 300, although receiving no request from the home appliance 300.

The home appliance 300 according to an embodiment of the disclosure may change an operation of the outputter 350 based on the output of the neural network, in operation 1250.

For example, when the home appliance 300 is the air conditioner 300-1, the air conditioner 300-1 may change at least one of operation temperature or an operation mode based on the output of the neural network.

That is, when a new terminal is connected to the access point 20 or a terminal connected to the access point 20 is disconnected from the access point 20, the air conditioner 300-1 may change at least one of operation temperature or an operation mode.

Figure 13:
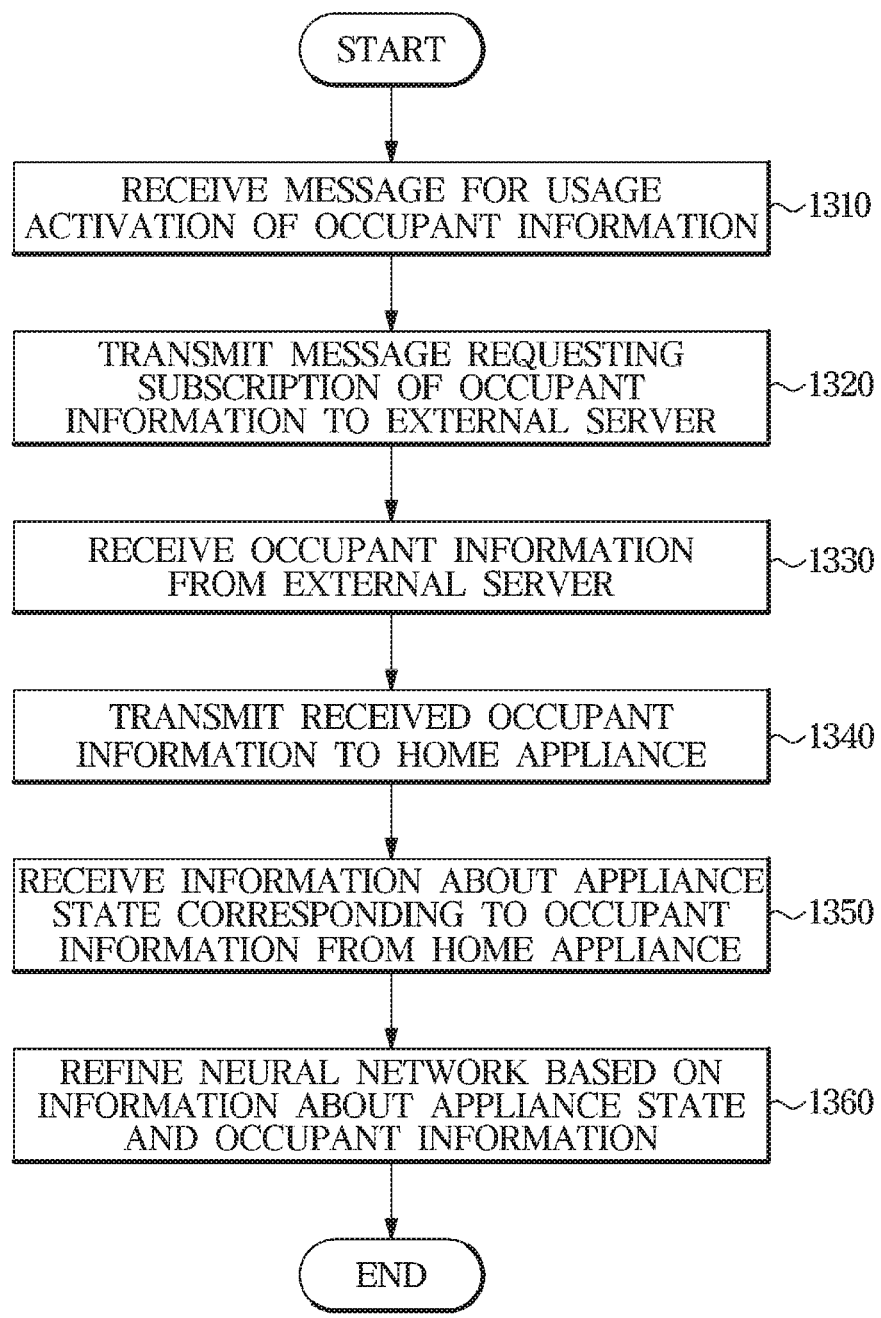
FIG. 13 is a flowchart related to a case of refining a neural network, in a method of controlling a server according to an embodiment of the disclosure.

FIG. 13 is a flowchart related to a case of refining a neural network, in a method of controlling the server 200 according to an embodiment of the disclosure.

Referring to FIG. 13, the second server 200 according to an embodiment of the disclosure may receive a message for usage activation of occupant information from the terminal 10 or the home appliance 300, in operation 1310.

When the second server 200 according to an embodiment of the disclosure receives the message for usage activation of occupant information, the second server 200 may transmit a message requesting a subscription of occupant information to an external server (e.g., the first server 100), in operation 1320.

That is, when the second server 200 receives a request from a user through the terminal 10 or the home appliance 300, the second server 200 may request the external server to transmit occupant information to collect the occupant information to learn a pre-stored neural network or acquire neural network output information through a learned neural network. However, according to some embodiments, the second server 200 may request the external server to transmit occupant information, although receiving no request from a user.

The second server 200 according to an embodiment of the disclosure may receive the occupant information from the external server, in operation 1330.

The external server may acquire information about occupants currently being in home H and the number of the occupants, that is, occupant information, based on a connection/disconnection of the terminal 10 to/from the access point 20 located in the home H.

However, the second server 200 may receive information about a terminal connected to the access point 20, corresponding to occupant information, from the access point 20.

When the second server 200 according to an embodiment of the disclosure receives the occupant information representing the occupants and the number of the occupants, the second server 200 may transmit the received occupant information to the home appliance 300, in operation 1340, and receive information about an appliance state corresponding to the occupant information from the home appliance 300, in operation 1350.

Herein, the information about the appliance state may include at least one of user setting information representing an operation command input from at least one of the occupants through the inputter 310 of the home appliance 300 or sensing information about a surrounding environment acquired by the sensor 320 of the home appliance 300.

The second server 200 according to an embodiment of the disclosure may refine a neural network based on the information about the appliance state and the occupant information, in operation 1360.

That is, the second server 200 may acquire user setting information and sensing information corresponding to occupant information in the normal mode in which the home appliance 300 operates according to an operation command input from a user, and refine a neural network that performs an operation on the occupant information to output an operation command for the home appliance 300 in the AI mode.

In other words, when an occupant represented by the occupant information is in the home H, the second server 200 may receive setting information of the home appliance 300 input from the occupant and sensing information about a surrounding environment acquired by the home appliance 300 to secure data for learning the neural network.

More specifically, the second server 200 may refine the neural network based on the information about the appliance state and the occupant information.

The neural network may be machine learning that images a neural structure capable of performing deep learning, wherein weights and biases corresponding to configurations of the neural network continue to change to improve the reliability of learning.

That is, the second server 200 may continue to refine weights and biases corresponding to configurations of the neural network based on the information about the appliance state and the occupant information received from the home appliance 300.

In other words, the second server 200 may continue to refine weights, biases, and activation functions included in the neural network based on the occupant information and the user setting information corresponding to the occupant information to improve an inference result of the neural network. However, the second server 200 may refine the neural network based on occupant information, sensing information, and user setting information corresponding to the occupant information and the sensing information.

Figure 14:
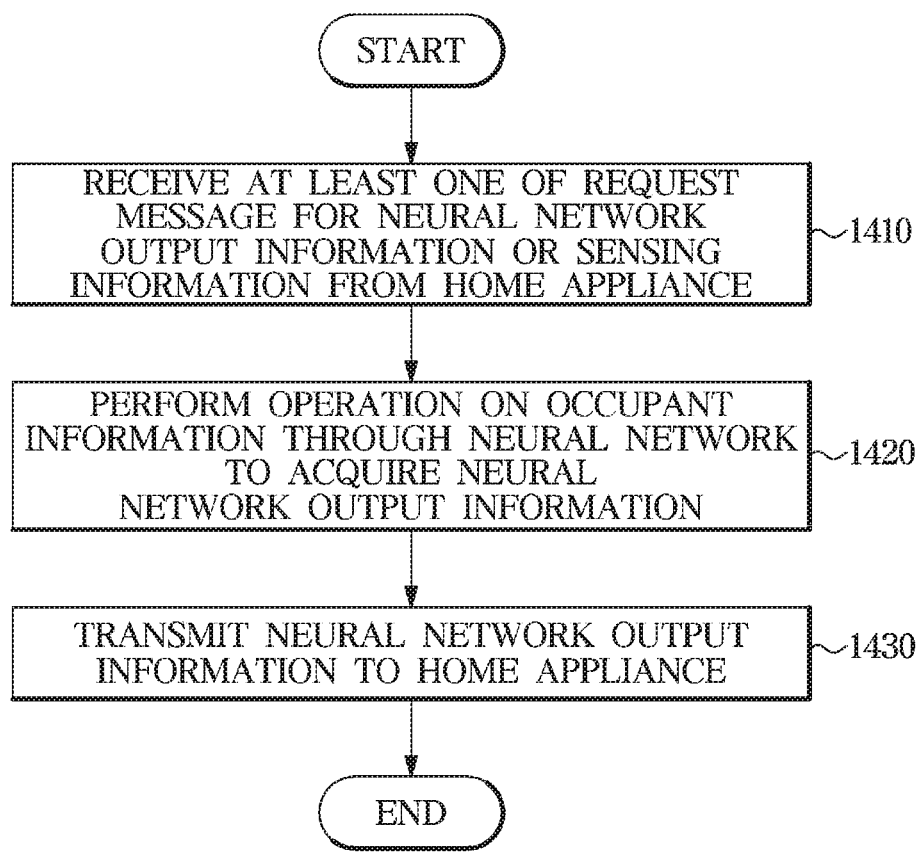
FIG. 14 is a flowchart related to a case of using a neural network, in a method of controlling a server according to an embodiment of the disclosure.

FIG. 14 is a flowchart related to a case of using a neural network, in the method of controlling the second server 200 according to an embodiment of the disclosure.

Referring to FIG. 14, the second server 200 according to an embodiment of the disclosure may receive at least one of a request message for neural network output information or sensing information from the home appliance 300, in operation 1410.

When the second server 200 according to an embodiment of the disclosure receives a request message for neural network output information from the home appliance 300, the second server 200 may perform an operation on occupant information through a neural network to acquire neural network output information, in operation 1420.

Herein, the neural network output information may correspond to information acquired when a neural network learned based on occupant information and information about an appliance state performs an operation on the occupant information, and the neural network output information may include an operation command for the home appliance 300, the operation command being optimized for the occupant information.

That is, the operation command included in the neural network output information may be an operation command with high frequency among operation commands set by a user with regard to occupants and the number of the occupants corresponding to the occupant information.

Also, the second server 200 according to an embodiment of the disclosure may acquire the neural network output information by further considering sensing information received together with a request for an output of the neural network from the home appliance 300, in addition to the occupant information.

The second server 200 according to an embodiment of the disclosure may transmit the neural network output information to the home appliance 300, in operation 1430. Thereby, the home appliance 300 may control the outputter 350 based on the neural network output information optimized for the occupants and the number of the occupants, without receiving any operation command from an occupant.

When the occupant information is refined according to a change of the occupants, the second server 200 may perform an operation on the refined occupant information through the neural network to refine the neural network output information, and control the communicator 220 to transmit the refined neural network output information to the home appliance 300.

That is, the second server 200 may reflect a change of the occupants according to entry or exit of an occupant to/from home H in real time so that the home appliance 300 operates according to an operation command optimized for occupants currently being in the home H and the number of the occupants.

The home appliance according to an embodiment of the disclosure may determine an operation command corresponding to an occupant through learning based on setting information of the home appliance according to the occupant to provide an operation satisfying all occupants.

Meanwhile, the disclosed embodiments may be implemented in the form of a recording medium that stores instructions executable by a computer. The instructions may be stored in the form of a program code, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the recording media may include Read Only Memory (ROM), Random Access Memory (RAM), a magnetic tape, a magnetic disc, flash memory, an optical data storage device, etc.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner configured to condition air of a dwelling, the air conditioner comprising:
   an outdoor unit; and
   an indoor unit including a heat exchanger,
   wherein the indoor unit comprises:
      a communicator configured to communicate with an access point to connect the air conditioner to a network through the access point; and
      a controller configured to:
         receive information from an external server, through the communicator, when a new terminal is connected to the access point or a terminal connected to the access point is disconnected from the access point,
         receive an input for an Artificial Intelligence (AI) mode from an occupant of the dwelling,
         when the input for the AI mode is received, control the communicator to transmit to the external server a message requesting the information, the information including information output by a neural network relating to terminals currently connected to the access point, and
         change an operation temperature of the air conditioner and/or an operation mode of the air conditioner in accordance with the received information.

2. The air conditioner according to claim 1, wherein the information output by the neural network includes an operation command for changing the operation temperature of the air conditioner and/or the operation mode of the air conditioner, and the controller is configured to change the operation temperature of the air conditioner and/or the operation mode of the air conditioner in accordance with the operation command.

3. The air conditioner according to claim 1, wherein
   the air conditioner is configured to receive an operation command from an occupant of the dwelling in which the air conditioner is to condition air, and
   the controller is further configured to transmit the operation command to the external server through the communicator.

4. The air conditioner according to claim 3, wherein the neural network is configured to be refined based on the transmitted operation command and terminals currently connected to the access point.

5. The air conditioner according to claim 3, further comprising:
   a sensor configured to acquire sensing information about a surrounding environment of the air conditioner,
   wherein the controller is further configured to control the communicator to transmit the sensing information to the external server.

6. The air conditioner according to claim 5, wherein the sensing information includes at least one of indoor temperature of the dwelling, indoor humidity of the dwelling, outdoor temperature outside of the dwelling and outdoor humidity outside of the dwelling.

7. The air conditioner according to claim 5, wherein the neural network is configured to be refined based on the transmitted operation command and the transmitted sensing information.

8. The air conditioner according to claim 1, wherein the information further includes sensing information about a surrounding environment of the air conditioner.

9. A method of controlling an air conditioner configured to condition air of a dwelling, the air conditioner comprising an outdoor unit, and an indoor unit, the indoor unit including a heat exchanger, and a communicator configured to communicate with an access point (AP), the method comprising:
   receiving information from an external server, through the communicator, when a new terminal is connected to the access point or a terminal connected to the access point is disconnected from the access point;
   receiving an input for an Artificial Intelligence (AI) mode from an occupant of the dwelling;
   when the input for the AI mode is received, controlling the communicator to transmit to the external server a message requesting the information, the information including information output by a neural network relating to terminals currently connected to the access point; and
   changing an operation temperature of the air conditioner and/or an operation mode of the air conditioner in accordance with the received information.

10. The method according to claim 9, wherein the information output by the neural network includes an operation command for changing the operation temperature of the air conditioner and/or the operation mode of the air conditioner, and wherein the method further comprises: changing the operation temperature of the air conditioner and/or the operation mode of the air conditioner in accordance with the operation command.

11. The method according to claim 9, further comprising:
receiving an operation command from an occupant of the dwelling in which the air conditioner is to condition air, and
transmitting the operation command to the external server through the communicator.

12. The method according to claim 11, further comprising:
refining the neural network based on the transmitted operation command and terminals currently connected to the access point.

13. The method according to claim 11, further comprising:
sensing, by a sensor, information about a surrounding environment of the air conditioner, and
controlling the communicator to transmit the sensing information to the external server.

14. The method according to claim 13, wherein the sensing information includes at least one of indoor temperature of the dwelling, indoor humidity of the dwelling, outdoor temperature outside of the dwelling and outdoor humidity outside of the dwelling.

15. The method according to claim 13, further comprising:
refining the neural network based on the transmitted operation command and the transmitted sensing information.

16. The method according to claim 9, wherein the information further includes sensing information about a surrounding environment of the air conditioner.

* * * * *